(12) United States Patent
Nakano et al.

(10) Patent No.: US 11,702,243 B2
(45) Date of Patent: Jul. 18, 2023

(54) CONTAINER FOR HOLDING LIQUID

(71) Applicant: AGC Inc., Chiyoda-ku (JP)

(72) Inventors: Masanori Nakano, Chiyoda-ku (JP); Masahiro Tsuda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 610 days.

(21) Appl. No.: 16/776,594

(22) Filed: Jan. 30, 2020

(65) Prior Publication Data

US 2020/0165028 A1 May 28, 2020

Related U.S. Application Data

(63) Continuation of application No. PCT/JP2018/028485, filed on Jul. 30, 2018.

(30) Foreign Application Priority Data

Aug. 3, 2017 (JP) ................................. 2017-150857

(51) Int. Cl.
*B65D 6/16* (2006.01)
*B65D 8/00* (2006.01)
(Continued)

(52) U.S. Cl.
CPC ............... *B65D 7/24* (2013.01); *B41B 11/54* (2013.01); *B65D 7/04* (2013.01); *B65D 7/06* (2013.01);
(Continued)

(58) Field of Classification Search
CPC ... B65D 7/24; B65D 7/04; B65D 7/06; B65D 7/22; B65D 90/028; B65D 90/08;
(Continued)

(56) References Cited

U.S. PATENT DOCUMENTS 4,244,486 A * 1/1981 Ewald, Jr. ............ B65D 88/123
220/4.12
4,865,213 A * 9/1989 Kruger ..................... E04H 7/20
220/4.16
(Continued)

FOREIGN PATENT DOCUMENTS

CN 202246389 U 5/2012
DE 101 33 471 A1 1/2003
(Continued)

OTHER PUBLICATIONS

Partial Supplementary Search Report dated Mar. 30, 2021 in corresponding European Patent Application No. 18840611.0, 18 pages.
(Continued)

*Primary Examiner* — Kareen K Thomas
(74) *Attorney, Agent, or Firm* — Oblon, McClelland, Maier & Neustadt, L.L.P.

(57) ABSTRACT

There are provided a liquid vessel which is capable of being configured in a large size of prefabricated form, and a method for producing a glass product.
A liquid vessel for holding a liquid, comprising at least a first member, a second member and a third member; and a first engageable portion and a second engageable portion being configured such that the first member and the second member are brought into contact with each other to be engaged, and a third engageable portion being configured such that the third member is brought into contact with the first member and the second member in a direction intersecting an engagement direction of the first member and the second member to be engaged with the first member and the second member.

18 Claims, 15 Drawing Sheets

(51) Int. Cl.
    *B65D 6/02*               (2006.01)
    *B65D 6/10*               (2006.01)
    *C03B 19/02*             (2006.01)
    *B41B 11/54*             (2006.01)
    *B65D 90/08*             (2006.01)
    *B65D 90/02*             (2019.01)
    *B41B 11/74*             (2006.01)
    *B65D 90/04*             (2006.01)

(52) U.S. Cl.
    CPC .............. *B65D 7/22* (2013.01); *B65D 90/028* (2013.01); *B65D 90/08* (2013.01); *C03B 19/02* (2013.01); *B41B 11/74* (2013.01); *B65D 90/04* (2013.01)

(58) Field of Classification Search
    CPC ......... B65D 90/04; B65D 90/02; B41B 11/54; B41B 11/74; C03B 19/02; C03B 5/42; C03B 18/16
    See application file for complete search history.

(56) References Cited

U.S. PATENT DOCUMENTS

| | | | | |
|---|---|---|---|---|
| 5,155,872 | A * | 10/1992 | Aymes | E04H 4/142 |
| | | | | 52/247 |
| 6,902,061 | B1 * | 6/2005 | Elstone | B65D 19/02 |
| | | | | 206/596 |
| 7,360,784 | B2 * | 4/2008 | Stewart | B60J 7/1614 |
| | | | | 280/30 |
| 7,703,632 | B2 * | 4/2010 | Kochanowski | B65D 88/522 |
| | | | | 220/666 |
| 7,896,184 | B2 * | 3/2011 | Meers | B65D 25/005 |
| | | | | 220/666 |
| 2007/0158345 | A1 * | 7/2007 | Booth | B65D 7/26 |
| | | | | 220/6 |
| 2009/0302046 | A1 * | 12/2009 | Roberts, Sr. | B65D 19/18 |
| | | | | 220/666 |
| 2010/0025409 | A1 * | 2/2010 | Hunter | F02B 77/13 |
| | | | | 206/319 |
| 2011/0011849 | A1 | 1/2011 | Kolberg et al. | |
| 2011/0290811 | A1 * | 12/2011 | Koefelda | B65D 11/1833 |
| | | | | 220/666 |

FOREIGN PATENT DOCUMENTS

| | | |
|---|---|---|
| FR | 1.270.366 | 8/1961 |
| FR | 1357788 A | 4/1964 |
| JP | 51-9941 A | 1/1976 |
| JP | 2010-215239 A | 9/2010 |
| KR | 10-0625119 B1 | 9/2006 |
| WO | WO 2015/177407 A1 | 11/2015 |

OTHER PUBLICATIONS

Extended European Search Report dated Jun. 2, 2021 in European Patent Application No. 18840611.0, 11 pages.
International Search Report dated Aug. 21, 2018 in PCT/JP2018/028485 filed on Jul. 30, 2018, 2 pages.
Partial European Search Report dated Jun. 24, 2022 in European Patent Application No. 22160688.2, 12 pages.

* cited by examiner

CONTAINER FOR HOLDING LIQUID

TECHNICAL FIELD

The present invention relates to a vessel for holding a liquid (also called liquid vessel) and utilization thereof.

BACKGROUND ART

As a small size of prefabricated and reusable liquid vessel, there has been known a vessel which has an inner circular member accommodated into an outer circular member such that the inner circular member has a lower end butted against a bottom member, and the outer circular member has a lower end fitted into an outer periphery of the bottom member (see Patent Document 1). Because this liquid vessel is configured in a prefabricated form, it is proposed to, even after having used the vessel as a vessel for an eating or drinking liquid or another item, reuse the liquid vessel by disassembling the vessel into the outer circular member, the inner circular member and the bottom member and washing the respective members, followed by assembling the members.

Nevertheless, in particular when a large size of liquid vessel is configured in a prefabricated form, many members are required to be assembled. For this reason, it is difficult to configure such a large size of liquid vessel in a prefabricated form because special measures are required to be taken to prevent a liquid from flowing out or leaking out through a gap between assembled members.

PRIOR ART DOCUMENTS

Patent Documents

Patent Document 1: JP-A-2010-215239

DISCLOSURE OF INVENTION

Technical Problem

The present invention provides a large size of liquid vessel which is capable of not only preventing a liquid held therein from flowing out or leaking out but also being configured in a prefabricated form. The present invention also provides a method for producing a glass product, which is as an effective utilization of the liquid vessel.

Solution to Problem

The present invention provides the following modes:

[1] A liquid vessel for holding a liquid, comprising at least a first member, a second member and a third member; and a first engageable portion and a second engageable portion being configured such that the first member and the second member are brought into contact with each other to be engaged, and a third engageable portion being configured such that the third member is brought into contact with the first member and the second member in a direction intersecting an engagement direction of the first member and the second member to be engaged with the first member and the second member.

[2] The liquid vessel recited in item [1], wherein the first engageable portion includes a first narrow space, which has a gap formed in the engagement direction of the first member and the second member and in an intersecting direction as viewed from a direction along an inner surface of the liquid vessel; the second engageable portion includes a second narrow space, which has a gap formed in the engagement direction of the first member and the second member and in the direction along the inner surface of the liquid vessel; the third engageable portion includes a third narrow space, which has a gap formed in a direction intersecting the engagement direction of the first member and the second member and in an intersecting direction as viewed from the direction along the inner surface of the liquid vessel; the second narrow space is interposed between the first narrow space and the third narrow space, and the first narrow space and the third narrow space is continuous to each other through the second narrow space; and the liquid vessel includes a wall portion, the wall portion having an inner side defined by at least the third member, the wall portion extending in a depth direction of the liquid vessel from a bottom portion of the liquid vessel and a periphery of the bottom portion.

[3] A method for producing a glass product, comprising using molten glass held in the liquid vessel.

[4] A method for producing a glass product, comprising holding a molten metal in the liquid vessel, and floating molten glass on the molten metal to form the glass product.

Advantageous Effects of Invention

According to the present invention, there is provided a prefabricated liquid vessel which is capable of not only preventing a liquid held therein from flowing out or leaking out but also being configured in a large size. According to the present invention, there is also provided a method for producing a glass product, which is as an effective utilization of the liquid vessel.

DESCRIPTION OF EMBODIMENTS

Figure 1:
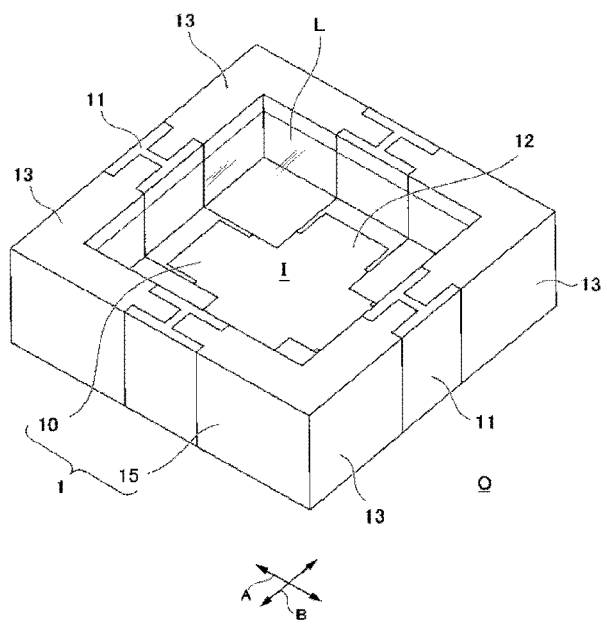
FIG. 1 is a perspective view illustrating a first embodiment of the liquid vessel according to the present invention.

Embodiments of the present invention will be described in reference to the accompanying drawings. It should be noted that the present invention is not limited to the embodiments described below, and that various changes and modifications are made possible in an optional way within the scope of the present invention. In the drawings referred to below, the scales, the numbers or the like of respective structures are shown in a different manner from those of actual structures in some cases in order to readily understand the respective structures.

First Embodiment

Figure 2:
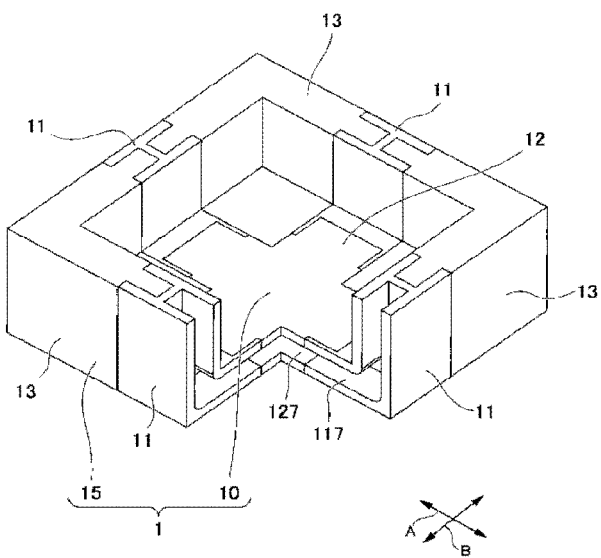
FIG. 2 is a perspective view illustrating a state wherein a third member is removed from the liquid vessel illustrated in FIG. 1.

As illustrated in FIGS. 1 and 2, the liquid vessel 1 according to this embodiment of the present invention includes a bottom portion 10 formed in a square shape, and a wall portion 15 formed in a square frame along an outer edge of the bottom portion 10. The wall portion 15 extends so as to rise from the outer edge (periphery) of the bottom portion 10 in a depth direction of the liquid vessel 1. The liquid vessel 1 is open on an opposite side of the bottom portion 10. The liquid vessel 1 holds a liquid L in an inner space I defined by the bottom portion 10 and the wall portion 15.

Specifically, the liquid vessel 1 is assembled from a plurality of first members 11, a second member 12 and a plurality of third members 13. The second member 12 is disposed in a central area of the bottom portion 10. The first members 11 are engaged with the second member 12. The third members 13 are engaged with the second member 12 and the first members 11. With regard to the first members 11, the second member 12 and the third members 13, the peripheral edge of a main surface of each member is called an end portion. The engagement is made between facing end portions of the first members 11, the second member 12 and the third members 13.

Figure 3:
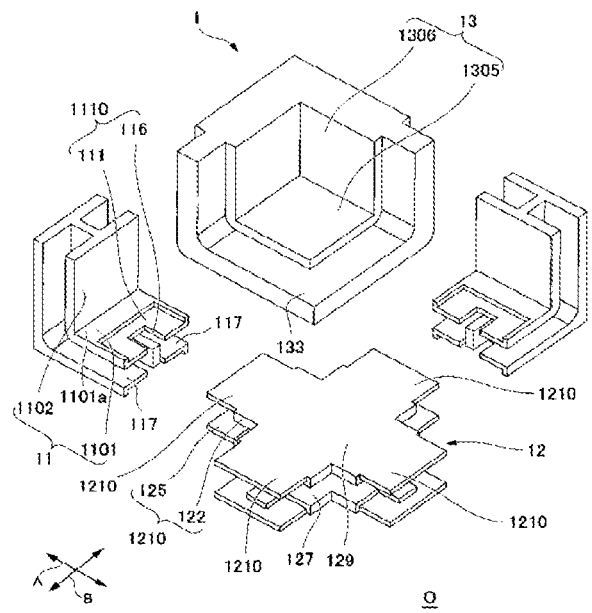
FIG. 3 is a disassembled perspective view illustrating a state wherein the liquid vessel illustrated in FIG. 2 has been disassembled.

As illustrated in FIG. 3, each first member 11 includes a first joint portion 1101 and a second joint portion 1102. The first joint portion 1101 forms a part of the bottom portion 10 of the liquid vessel 1 (see FIG. 1). The second joint portion 1102 extends from an outer end portion 1101a of the first joint portion 1101 so as to intersect the depth direction of the liquid vessel 1. The second joint portion forms a part of the wall portion 15 (see FIG. 1).

Figure 4:
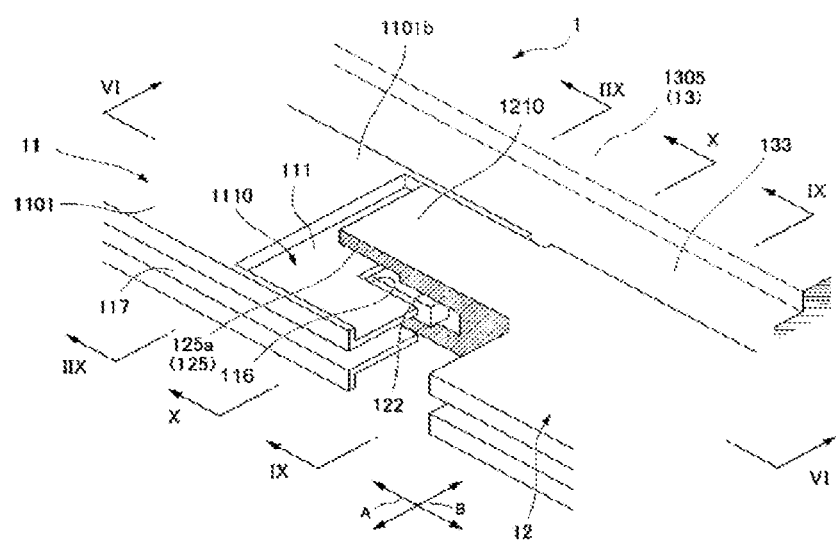
FIG. 4 is a perspective view illustrating how the liquid vessel illustrated in FIG. 3 is assembled by engagement.
Figure 5:
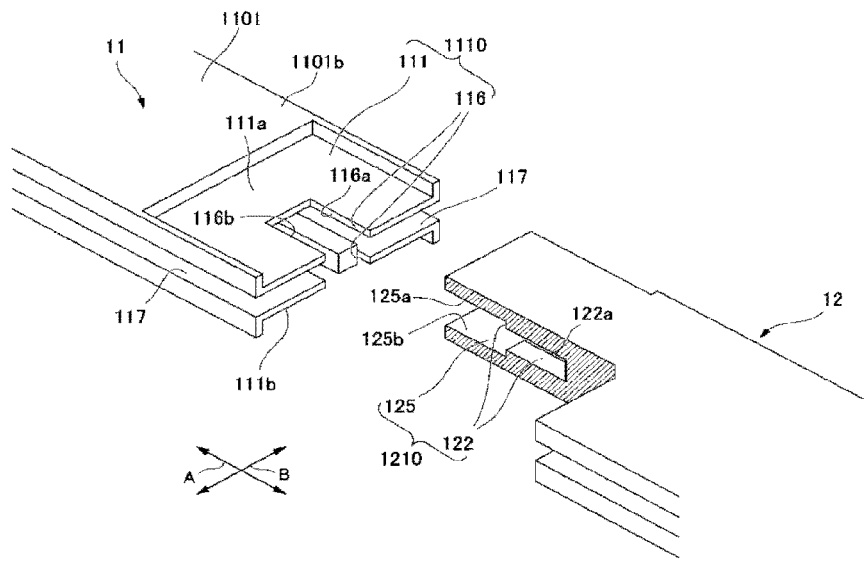
FIG. 5 is a disassembled perspective view illustrating a state wherein the first member and the second member illustrated in FIG. 4 have been disassembled.

As illustrated in FIGS. 4 and 5, each first member 11 has third recessed portions 117 on respective sides. The first joint portion 1101 of each first member 11 extends from the wall portion 15 of the liquid vessel 1 (see FIG. 1) to the second member 12. The first joint portion 1101 has a first engageable projecting portion 1110 formed on an end portion (hereinbelow, referred to as inner end portion) 1101b facing a central area of the liquid vessel 1. The first engageable projecting portion 1110 further includes a first projection 111 and a second recess 116.

The first projection 111 has a pair of first projecting surfaces 111a and 111b. The second recess 116 has a pair of first recessed side surfaces 116a and 116b.

As illustrated in FIG. 3, the second member 12 is disposed in the central area of the bottom portion 10 (see FIG. 1). The first engageable projecting portion 1110 of each first joint portion 1101 is engaged with the second member 12. The second member 12 has a base 129 and a plurality of second engageable recessed portions 1210 formed on the periphery of the base 129.

The second engageable recessed portions 1210 are circumferentially disposed at equal intervals so as to radially project from an outer periphery of the base 129 toward an external space O of the liquid vessel 1.

Figure 6:
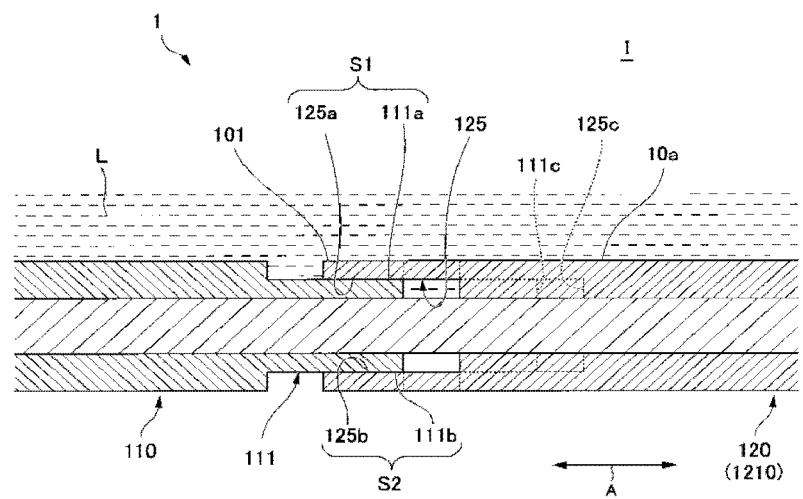
FIG. 6 is a cross-sectional view illustrating the liquid vessel taken along line VI-VI of FIG. 4.
Figure 7:
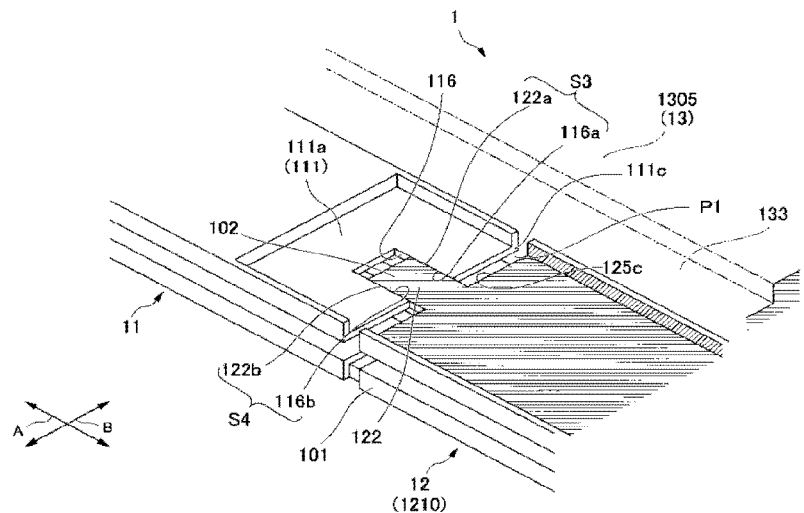
FIG. 7 is a perspective view illustrating a state wherein a portion of the liquid vessel is broken.

As illustrated in FIGS. 5, 6 and 7, each second engageable recessed portion 1210 includes a first recess 125 engageable with its corresponding first projection 111 and a pair of second projections 122 formed on the first recessed portion 125. Each first recessed portion 125 has a pair of first recessed surfaces 125a and 125b. Each second projection 122 has a pair of projecting side surfaces 122a and 12b.

The first projection 111 of each first engageable projecting portion 1110 is engaged with the first recess 125 of its corresponding second engageable recessed portion 1210 to form a first engageable portion 101.

Each first projection 111 is engaged with its corresponding first recessed portion 125 to form a first narrow space S1 defined by one 111*a* of its paired first projecting surfaces 111*a* and 111*b*, and one 125*a* of its corresponding paired first recessed surfaces 125*a* and 125*b*. Likewise, a first narrow space S2 is formed, being defined by the other one 111*b* of each pair of first projecting surfaces 111*a* and 111*b*, and the other one 125*b* of the corresponding paired first recessed surfaces 125*a* and 125*b*.

Thus, each first engageable portion 101 has a pair of the first narrow spaces S1 and S2. Each of the paired first narrow spaces S1 and S2 has a gap formed as a space that prevents the liquid L in the liquid vessel 1 from flowing out. In other words, the gap formed in each of the paired first narrow spaces S1 and S2 has a size that does not serve as a route allowing the liquid L to pass therethrough. This is also applicable to the narrow spaces described later.

In each pair of first narrow spaces S1 and S2, the gap is formed so as to extend in an engagement direction of its corresponding first member 11 and the second member 12 (directions indicated by an arrow A) and in an intersecting direction as viewed from a direction along a bottom surface (inner surface) 10*a* of the liquid vessel 1 (i.e. the depth direction of the liquid vessel 1).

It is not essential that the gap of each pair of first narrow spaces S1 and S2 have a constant size. It is sufficient that the gap has a smaller size than a certain value. The gap may entirely or partly have a size of zero or have a size varying from position to position. This is also applicable to the gaps of the other narrow spaces described later.

Each second recess 116 has its paired first recessed side surfaces 116*a* and 116*b*. Each second projecting portion 122 has its paired projecting side surfaces 122*a* and 122*b*. The second recess 116 of each first engageable projecting portion 1110 is engaged with the second projecting portions 122 of its corresponding second engageable recess 1210 to form a second engageable portion 102.

Each second recess 116 is engaged with its corresponding second projecting portions 122 to form a second narrow space S3 defined by one 116*a* of its paired first recessed side surfaces 116*a* and 116*b*, and one 122*a* of its corresponding paired projecting side surfaces 122*a* and 122*b*. The other one 116*b* of each pair of first recessed side surfaces 116*a* and 116*b* is engaged with the other one 122*b* of its corresponding paired projecting side surfaces 122*a* and 122*b* to form a second narrow space S4.

In other words, each second engageable portion 102 has its paired second narrow spaces S3 and S4. Each of the second narrow spaces S3 and S4 has a gap formed as a space that prevents the liquid L in the liquid vessel 1 from flowing out. In each of the paired second narrow spaces S3 and S4, the gap is formed so as to extend in the engagement direction of its corresponding first member 11 and the second member 12 (directions indicated by an arrow A) and in the direction along the bottom surface (inner surface) 10*a* of the liquid vessel 1.

Returning to FIGS. 2 and 3, the second member 12 and the first joint portion 1101 of each first member 11 form a part of the bottom portion 10 of the liquid vessel 1 (see FIG. 1) in a state wherein each first projection 111 is engaged with its corresponding first recess 125 while each second projection 122 is engaged with its corresponding second recess 116 (see FIG. 7 as well).

Each second joint portion 1102 extends in a direction intersecting its corresponding first joint portion 1101 (in other words, in the depth direction) such that each second joint portion 1102 forms a part of the wall portion 15 of the liquid vessel 1 (see FIG. 1).

Each third member 13 has a third projection 133 engaged with the third recessed portion 117 of its corresponding first member 11 and a third recess 127 of the second member 12.

Each third member 13 has a first flat area 1305 and a second flat area 1306. Further, each third member 13 has a third projection 133 engageable with the third recessed portion 117 of its corresponding first member 11 and the third recess 127 of the second member 12.

Figure 8:
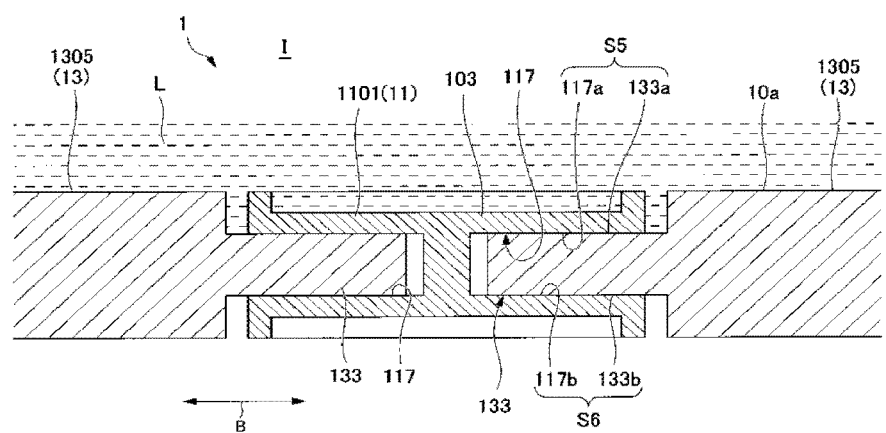
FIG. 8 is a cross-sectional view illustrating the liquid vessel taken along line IIX-IIX of FIG. 4.
Figure 9:
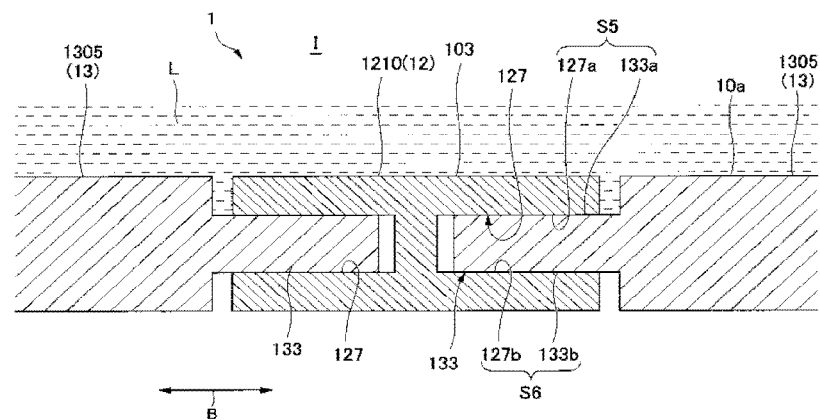
FIG. 9 is a cross-sectional view illustrating the liquid vessel taken along line IX-IX of FIG. 4.

As illustrated in FIGS. 8 and 9, the third recessed portion 117 of each first member 11 includes a pair of third recessed surfaces 117*a* and 117*b*. Each third projection 133 includes a pair of third projecting surfaces 133*a* and 133*b*.

Each third projection 133 is engaged with the first joint portion 1101 of its corresponding first member 11 in a direction (directions indicated by an arrow B) intersecting the engagement direction of the first member 11 and the second member 12 (directions indicated by an arrow A).

Further, the third recess 127 of the second member 12 includes a pair of third recessed surfaces 127*a* and 127*b*. Each third projection 133 is engaged with the third recess 127 of the second member 12 in the direction (directions indicated by the arrow B) intersecting the engagement direction of the first member 11 and the second member 12 (directions indicated by an arrow A).

The second member 12 and each third projection 133 form a third engageable portion 103 such that each first joint portion 1101 and the corresponding third projection 133 form a third engageable portion 103.

Each third projection 133 is engaged with the third recessed portion 117 of its corresponding first member 11 (first joint portion 1101) to form a third narrow space S5 defined by the third projecting surface 133*a* of this third projection 133 and the third recessed surface 117*a* of this third recessed portion 117. Likewise, a third narrow space S6 is formed, being defined by the third projecting surface 133*b* of this third projection 133 and the third recessed surface 117*b* of this third recessed portion 117.

Each of the third narrow spaces S5 and S6 has a gap formed as a space that prevents the liquid L in the liquid vessel 1 from flowing out. In each of the third narrow spaces S5 and S6, the gap is formed so as to extend in a direction intersecting the engagement direction of its corresponding first member 11 and the second member 12 and in an intersecting direction (the depth direction of the liquid vessel 1) seen from the direction along the bottom surface 10*a* of the liquid vessel 1.

Each third projection 133 is engaged with the third recess 127 of the second member 12 to form a third narrow space S5 defined by the third projecting surface 133*a* of this third projection 133 and the third recessed surface 127*a* of this third recess 127 as in the other portions of the third narrow space S5 formed by the other third projections 133 and the other first members 11. The third projecting surface 133*b* of a third projecting portion 133 and the third recessed surface 127*a* of its corresponding third recessed portion 127 form a third narrow space S6 as in the other portions of the third narrow spaces S6 formed by the other third projections 133 and the other first members 11.

Figure 10:
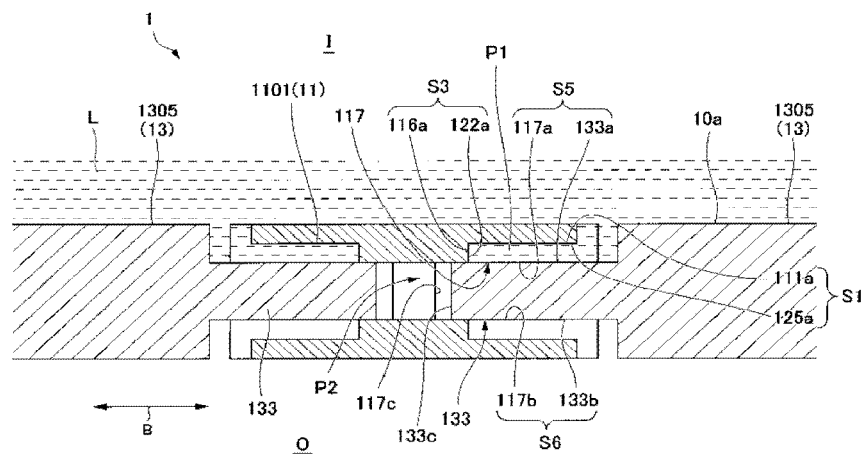
FIG. 10 is a cross-sectional view illustrating the liquid vessel taken along line X-X of FIG. 4.

As illustrated in FIGS. 7 and 10, the first members 11 and the second member 12 are combined so as to be brought into contact with each other. When the liquid vessel is subjected, for example, to deformation caused by an earthquake or to an installation error, a space P1 is formed between a leading edge 111c of each first projection 111 and a bottom 125c of each first recess 125 (see FIG. 6).

In the first embodiment, each space P1 never communicates with the inner space I of the liquid vessel 1. A leading edge 133c of each third projecting portion 133 and a bottom 117c of its corresponding third recessed portion 117 are combined so as to be brought into contact with each other. When the liquid vessel is subjected, for example, to deformation caused by an earthquake or to an installation error, a space P2 is formed between the combined leading edge and bottom. In the first embodiment, each space P2 never communicates with the external space O of the liquid vessel 1. This is because measures are taken such that the liquid L that has entered in the space P1 is prevented from flowing into the space P2.

In other words, in the first embodiment, each second narrow space S3 is formed between its corresponding space P1 and its corresponding space P2, each second narrow space S3 is interposed between its corresponding first narrow space S1 and its corresponding third narrow space S5, and each first narrow space S1 and its corresponding third narrow space S5 communicate each other through its corresponding second narrow space S3.

In a case where there is a single engageable portion unlike the first embodiment, when engagement is shifted to form a space, this space serves as a liquid route. Further, when displacement is made in other directions than the engagement direction, a liquid route is generated because there is no degree of freedom in the deformation among members.

In a case where engagement is made at two locations unlike the first embodiment, when the engagement is shifted to form spaces, some of the spaces do not serves as a liquid route, although the other spaces serve as a liquid route. Further, when displacement is made in other directions than the engagement direction, a liquid route is generated because there is no degree of freedom in the deformation among members.

In contrast, in the first embodiment, when the first engageable portions and their corresponding second engageable portions are shifted to form spaces, some of the spaces do not serve as a liquid route, although the other spaces serve as a liquid route. Nevertheless, the provision of the third engageable portions blocks the liquid route in the other spaces to prevent a liquid from leaking outwardly. Further, the provision of the third engageable portions ensures a degree of freedom in the deformation among members with respect to the displacement of a first engageable portion and its corresponding second engageable portion in other directions than the engagement direction. Even when shifting is made in a direction toward or away from a third engageable portion to form a space, no liquid route is formed.

As described above, the provision of such sets of three engageable portions according to the embodiment of the present invention ensures not only a degree of freedom in a single engagement direction but also a degree of freedom in engagement directions intersecting the single engagement direction. Further, even when engagement is shifted to generate a space, no liquid route is formed from the inner space of the liquid vessel to the external space of the liquid vessel so long as the engagement is maintained.

In other words, even when external forces are generated in two directions by an earthquake or another external factor after installation of the liquid vessel 1, the provision of such sets of three engageable portions according to the embodiment of the present invention causes nothing more than shifting among the first members 11, the second member 12 and the third members 13, and no liquid L leaks out so long as the engaged state of the combined members is maintained.

The provision of such sets of three engageable portions according to the embodiment of the present invention increases the tolerance to the installation accuracy in installation of the respective members because it is sufficient to pay attention only to the dimensional accuracy of the respective members.

It should be noted that the size of the spaces formed in the engageable portions may be defined by the lengths of the projections and the lengths of the recesses in the engageable portions in the engagement directions. From this point of view, it is sufficient to estimate how much shifting would occur in each engageable portion and to set the lengths of the projections and the lengths of the recesses in the engageable portions in the engagement directions to have greater lengths than the estimated shifting lengths so as to prevent disengagement.

Now, how to calculate the gap of each narrow space will be explained. In order to prevent the liquid L from leaking out, the following formula may be satisfied:

$$GAP \leq 2\sigma \cdot \cos\theta / (\rho \cdot g \cdot d)$$

wherein the symbols in the formula indicate the following meanings:
GAP: the gap of each narrow space (first to third narrow spaces S1 to S6)
σ: the surface tension of a held liquid
θ: the contact angle of the held liquid to a liquid vessel
ρ: the density of the held liquid
g: gravity acceleration
d: the height of the liquid surface of the held liquid in the liquid vessel For example, when the liquid L is a molten metal of tin held in a liquid vessel 1 made of carbon, the allowable gap of each narrow space will be specified below. Here, the molten metal of tin has a depth set at 50 mm.

In this case, the molten metal of tin has a surface tension of 0.5 N/m and a contact angle of 135 degrees to carbon and a density of 7,000 kg/m$^3$. Based on these values, it is sufficient that the gap of each narrow space is not greater than 0.2 mm. Conversely, even when there is a narrow space having a gap of about 0.1 mm, the molten metal of tin is prevented from flowing out.

For example, when the liquid L is molten glass held in a liquid vessel 1 made of carbon, the allowable gap of each narrow space will be specified below. Here, the molten glass has a depth set at 50 mm.

In this case, the molten glass has a surface tension of 0.3 N/m and a contact angle of 135 degrees to carbon and a density of 2,500 kg/m$^3$. Based on these values, it is sufficient that the gap of each narrow space is not greater than 0.35 mm. Conversely, even when there is a narrow space having a gap of about 0.3 mm, the molten glass is prevented from flowing out.

For example, when the liquid L is water held in a liquid vessel 1 having water repellency, the allowable gap of each narrow space will be specified below. Here, the water has a depth set at 50 mm.

In this case, the water has a surface tension of 0.072 N/m and a contact angle of 135 degrees to the liquid vessel 1 having water repellency and a density of 1,000 kg/m$^3$. Based on these values, it is sufficient that the gap of each narrow space is not greater than 0.2 mm.

It is possible to make up the liquid vessel 1 in a leakage-free manner by designing the respective narrow spaces as described above. Because it is not necessary to set the gap of each narrow space to zero as described above, and because it is sufficient to set the gap of each narrow space to not greater than a predetermined value, it is not necessary pay more attention than necessary on the production of the respective constituent members 11, 12 and 13 of the liquid vessel 1 according to the present invention.

As described about the liquid vessel 1 according to the first embodiment, the liquid L is prevented from entering the respective narrow spaces by its surface tension.

In other words, even when the occurrence of deformation by an earthquake or an installation error causes a space P1 to be formed between a first member 11 and the second member 12 configured so as to be brought into contact with each other, and when the liquid L flows into the space P1, the provision of sets of a first narrow space S1, a second narrow space S3 and a third narrow space S5 can prevent the liquid from flowing out into their corresponding space P2. The inside of the liquid vessel 1 is made of the plurality of first members 11, the second member 12 and the plurality of third members 13. Thus, the liquid L can be prevented from flowing out from the inner space I of the liquid vessel to the external space O.

As describe above, the plurality of first members 11, the second member 12 and the plurality of third members 13 can be all engaged as illustrated in FIGS. 2 and 3 to easily make up the liquid vessel 1 in a large size of prefabricated form. It is impossible to produce the structure of such a liquid vessel by using of the method of laying bricks.

Specifically, the liquid vessel 1 can be assembled in a large size so as to have the bottom portion 10 formed in a square shape in a planar view and the wall portion 15 formed in a square frame along the outer edge of the bottom portion 10.

The liquid vessel 1 can be made up in a large size of prefabricated form by a simple structure that each first member 11 is merely provided with a first engageable projecting portion 1110 and a third recessed portion 117, the second member 12 is merely provided with the second engageable recessed portions 1210 and the third recessed portion 127, and each third member 13 is merely provided with a third projecting portion 133.

Further, the second member 12 is provided with the plurality of second engageable recessed portions 1210, and the first members 11 are engaged with the second engageable recessed portions 1210. Thus, the plurality of first members 11 are engaged with the single second member 12. The number of the parts required for assembling the liquid vessel 1 can be minimized to simplify the structure.

The third members 13 are engaged with the first members 11 and the second member 12 to form the bottom portion 10 and the wall portion 15 of the liquid vessel 1 for example. Thus, the number of the parts required for assembling the liquid vessel 1 can be further minimized to simplify the structure.

Although explanation of the liquid vessel 1 according to the first embodiment has been made about a case where the first joint portion 1101 of each first member 11 is provided with a first engageable projecting portion 1110, and the second member 12 is provided with the second engageable recessed portions 1210, the present invention is not limited to such a case. Conversely, the first joint portions 1101 of the first members 11 may be interchanged with the second engageable recessed portions 1210 of the second member 12 as another case.

With regard to the design of such sets of three engageable portions according to the embodiment of the present invention, each set of three engageable portions is formed to have a first narrow space, a second narrow space and a third narrow space formed without a large gap being formed between engaged members.

Now, first to seventh modifications of the first embodiment will be described in reference to FIG. 11 to FIG. 18.

(First Modification)

Figure 11:
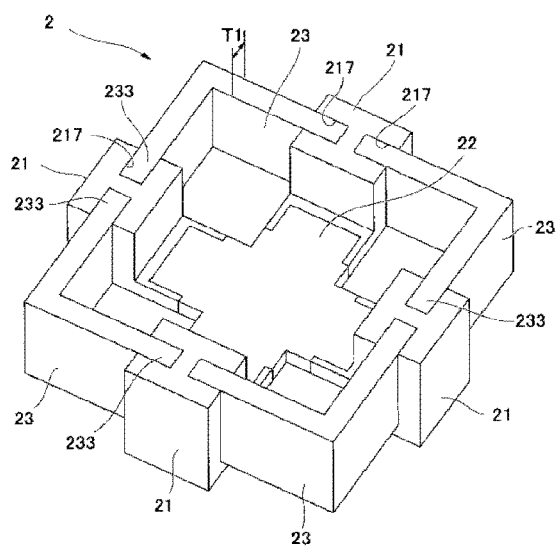
FIG. 11 is a perspective view illustrating a first modification of the liquid vessel according to the first embodiment of the present invention.

As illustrated in FIG. 11, the liquid vessel 2 according to this modification is configured so as to have the same structure as the liquid vessel 1 according to the first embodiment except that the third members 13 are replaced with third members 23.

Each third member 23 entirely has a uniform plate thickness T1. The plate thickness T1 is set to a thickness engageable with the third recessed portion 217 of a first member 21 to be engaged. In other words, each third member 23 has a plate thickness T1 equal to the thickness of each third projection 233.

In this manner, the entire plate thickness T1 of the third members 23 can be reduced to a thickness equal to the thickness of each third projection 233. Thus, the size of the plate thickness T1 of the third members 23 can be minimized to reduce the weight of the liquid vessel 2.

(Second Modification)

Figure 12:
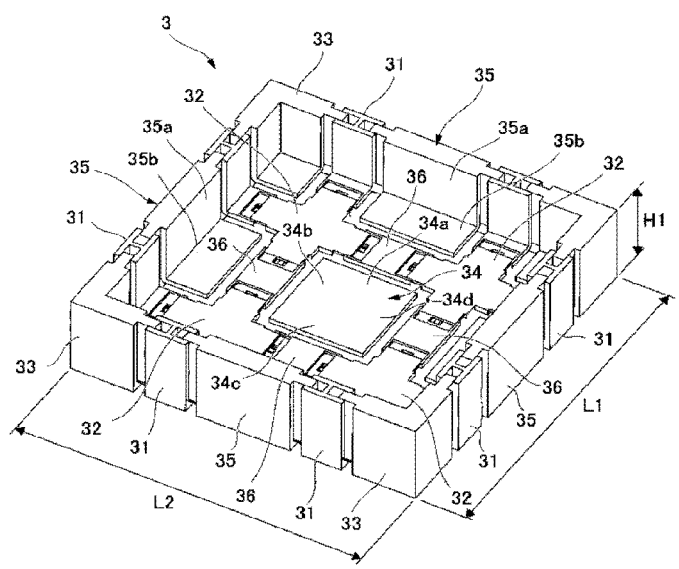
FIG. 12 is a perspective view illustrating a second modification of the liquid vessel according to the first embodiment of the present invention.

As illustrated in FIG. 12, the liquid vessel 3 according to this modification includes a plurality of first members 31, a plurality of second members 32 and a plurality of third members 33. Further, the liquid vessel 3 includes a fourth member 34, a plurality of fifth members 35 and a plurality of sixth members 36.

The fourth member 34 is disposed in a central area of a bottom portion of the liquid vessel 3 and is formed in a square shape in a planar view.

Each fifth member 35 is engaged mainly between its adjacent first members 31 as in the respective members 11, 12 and 13 according to the first embodiment. The fifth members 35 are disposed at positions opposed to respective sides 34*a* to 34*d* of the fourth member 34. Each fifth member 35 is formed in an L-character shape in a side view and includes a portion 35*b* forming a part of the bottom portion of the liquid vessel 3 and a portion 35*a* forming a part of a wall portion of the liquid vessel 3.

Each sixth member 36 is engaged between its adjacent fifth member 35 and the fourth member 34 opposing each other and between its adjacent pair of second members 32 as in the respective members 11, 12 and 13 according to the first embodiment. Each sixth member 36 forms a part of the bottom portion of the liquid vessel 3.

The wall portion of the liquid vessel 3 is formed in a single layer and has a height of H1.

The fourth member 34 is disposed in a central area of the bottom portion of the liquid vessel 3, and each fifth member 35 is engaged between its adjacent first members 31. Thus, the respective sides of the liquid vessel 3 can have longer lengths L1 and L2 than the sides of the liquid vessel 1 according to the first embodiment. In other words, the second modification allows the liquid vessel 3 to be produced in a larger size of prefabricated form than the liquid vessel 1.

Although explanation of the liquid vessel 3 according to the second modification has been made about a case where the wall portion of the liquid vessel 3 is formed in a single layer and have a height of H1, the liquid vessel is not limited to this mode. The wall portion of the liquid vessel 3 may have a plurality of stacked layers and a larger height H1.

(Third Modification)

Figure 13:
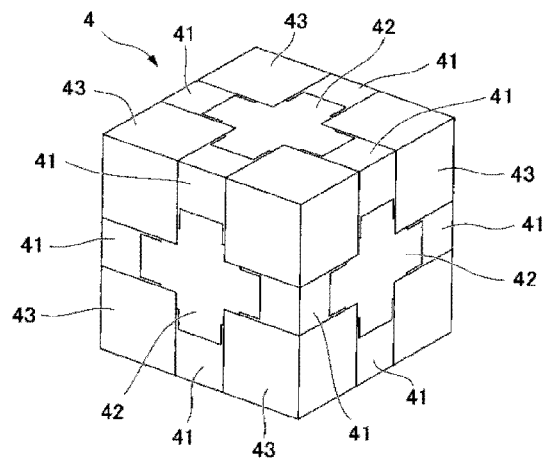
FIG. 13 is a perspective view illustrating a third modification of the liquid vessel according to the first embodiment of the present invention.
Figure 14:
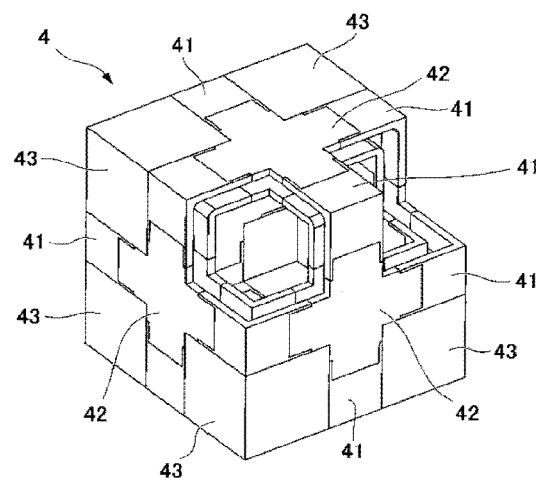
FIG. 14 is a perspective view illustrating a state wherein some members have been removed from the liquid vessel illustrated in FIG. 13.

As illustrated in FIGS. 13 and 14, the liquid vessel 4 according to this modification includes a plurality of first members 41, a plurality of second members 42 and a plurality of third members 43. In each first member 41, the second joint portion 1102 of each first member 11 according to the first embodiment (see FIG. 3) is replaced with first joint portions 1101. In other words, each first member 41 is configured to have a pair of first joint portions 1101 formed in an L-character shape in a side view.

Each third member 43 has an additional third projection (not shown) formed on sides corresponding to the opening sides of the third members 13 according to the first embodiment (see FIG. 3). In other words, each third member has a third projection extending from all peripheral sides.

In the liquid vessel 4, the plurality of first member 41, the plurality of second member 42 and the plurality of third members 43 are engaged as in the respective members 11, 12 and 13 according to the first embodiment. In this way, the plurality of first members 41, the plurality of second members 42 and the plurality of third members 43 are engaged to form the liquid vessel 4 in a fully-closed state with no opening. In other words, the liquid vessel 4 is provided as a prefabricated liquid vessel wherein the opening opposite to the bottom portion of the liquid vessel 1 according to the first embodiment is closed.

(Fourth Modification)

Figure 15:
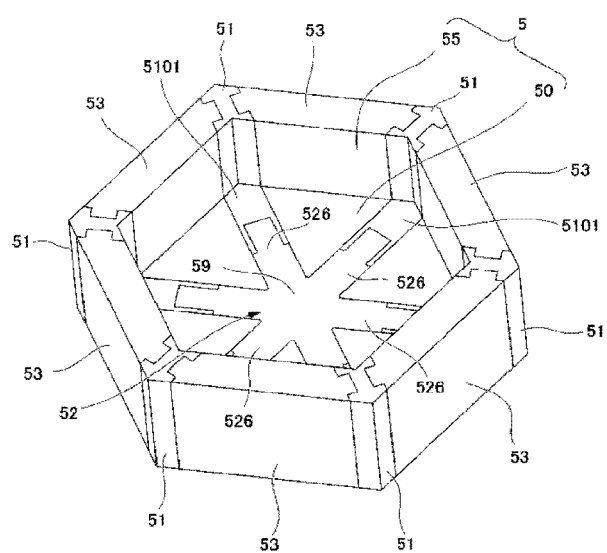
FIG. 15 is a perspective view illustrating a fourth modification of the liquid vessel according to the first embodiment of the present invention.

As illustrated in FIG. 15, the liquid vessel 5 according to this modification has a bottom portion 50 formed in a hexagonal shape and a wall portion 55 formed in a hexagonal frame along an outer edge (peripheral sides) of the bottom portion 50.

The liquid vessel 5 has a plurality of first members 51, a second member 52 and a plurality of third members 53. In each first member 51, the second joint portion 1102 of each first member 11 according to the first embodiment (see FIG. 3) is formed in a V-character shape in a planar view, and the remaining portions are formed in the same as those of each first member 11.

The second member 52 is a member similar to the second member 12 according to the first embodiment (see FIG. 3). The second member 52 has six second recessed projecting portions 526 radially projecting from a base 59 at equal intervals. Each first member 51 has a first joint portion 5101 engaged with its corresponding second recessed projecting portion 526, being brought into contact with this second recessed projecting portion as in the first embodiment.

Each third member 53 is disposed between its adjacent first members 51. In each third member 53, an area corresponding to the first flat area 1305 of each third member 13 according to the first embodiment (see FIG. 3) is formed in a triangular shape in a planar view, and the remaining portions are the same as those of each third member 13. Each third member 53 is engaged with its adjacent first member 51 and the second member 52 as in the first embodiment.

(Fifth Modification)

Figure 16:
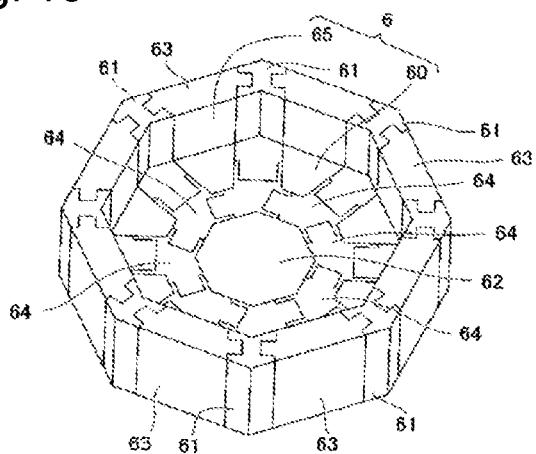
FIG. 16 is a perspective view illustrating a fifth modification of the liquid vessel according to the first embodiment of the present invention.
Figure 17:
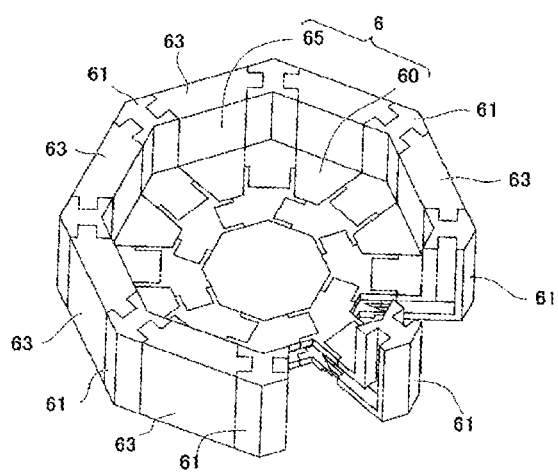
FIG. 17 is a perspective view illustrating a state wherein some members have been removed from the liquid vessel illustrated in FIG. 16.

As illustrated in FIGS. 16 and 17, the liquid vessel 6 according to this modification has a bottom portion 60 formed in an octagonal shape and a wall portion 65 formed in an octagonal frame along an outer edge (peripheral sides) of the bottom portion 60. The liquid vessel 6 includes a plurality of first members 61, a second member 62, a plurality of third members 63 and a plurality of fourth members 64.

In each first member 61, a portion corresponding to the second joint portion 1102 of each first member 11 according to the first embodiment (see FIG. 3) is formed in a V-character shape in a planar view, and the remaining portions are formed in similar to those of each first portion 11.

The second member 62 is disposed a central area of the bottom portion 60 of the liquid vessel 6 so as to be formed in an octagonal shape in a planar view. The plurality of fourth members 64 are engaged with peripheral sides of the second member 62. Each first member 61 is engaged with its corresponding fourth member 64, being brought into contact with this fourth member. Each third member 63 is engaged between its adjacent first members 61.

The first members 61, the second member 62, the third members 63 and the fourth members 64 are engaged together as in the first members 11, the second member 12 and the third members 13 according to the first member to produce a prefabricated liquid vessel.

(Sixth Modification)

Figure 18:
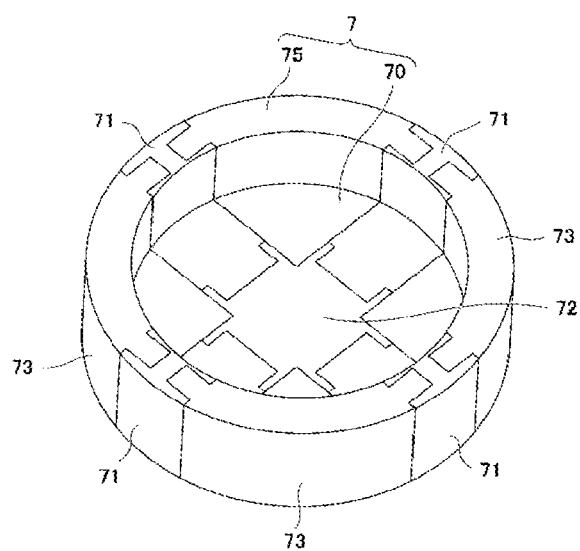
FIG. 18 is a perspective view illustrating a sixth modification of the liquid vessel according to the first embodiment of the present invention.

As illustrated in FIG. 18, the liquid vessel 7 according to this modification has a bottom portion 70 formed in a circular shape and a wall portion 75 formed in a cylindrical shape along an outer edge (peripheral side) of the bottom portion 70. The liquid vessel 7 includes a plurality of first members 71, a second member 72 and third members 73.

In each first member 71, the second joint portion 1102 of each first member 11 according to the first embodiment (see FIG. 3) is formed in a curved shape in a planar view.

The second member 72 is disposed in an central area of the bottom portion 70 of the liquid vessel 7. The first members 71 are engaged with the second member 72, being brought into contact with the second member. Each third member 73 is engaged between its adjacent first members 71. In each third member 73, the second flat area 1306 of each third member 13 according to the first embodiment (see FIG. 3) is formed in an arc-shape in a planar view.

The first members 71, the second member 72 and the third members 73 are engaged together as in the first members 11, the second member 12 and the third member 13 according to the first embodiment to produce a prefabricated liquid vessel.

As described above, each of the liquid vessels 1, 2, 3, 4, 5, 6 and 7 according to the first embodiment and the first to sixth modifications allows the bottom portion to be formed in a polygonal shape and the wall portion to be formed in a polygonal frame along the out edge (peripheral sides) of the bottom portion. Thus, the shape of the liquid vessel can be selected according to applications of the liquid vessel to expand the applications of the liquid vessel.

Now, the liquid vessels 8 and 9 according to a second embodiment and a third embodiment will be described in reference to FIGS. 19 to 27 and FIGS. 28 to 34.

Second Embodiment

Figure 19:
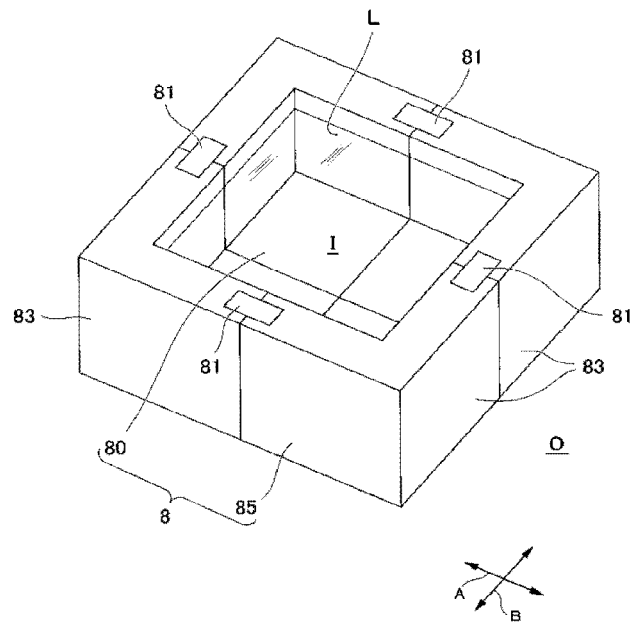
FIG. 19 is a perspective view illustrating a second embodiment of the liquid vessel according to the present invention.
Figure 20:
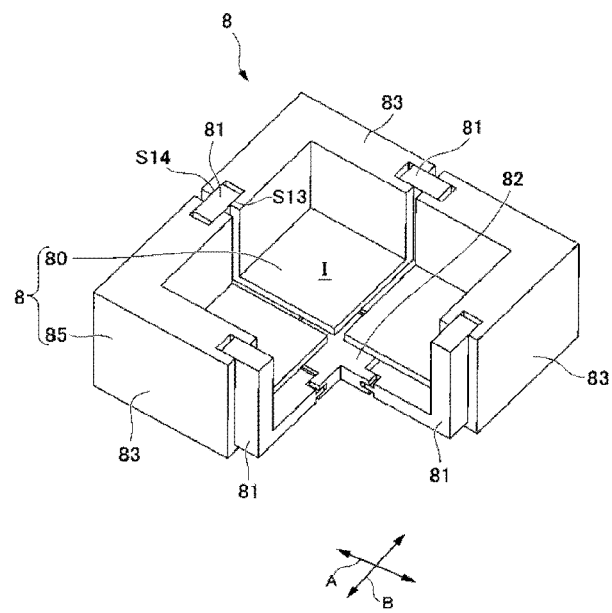
FIG. 20 is a perspective view illustrating a state wherein a third member is removed from the liquid vessel illustrated in FIG. 19.

As illustrated in FIGS. 19 and 20, the liquid vessel 8 according to this embodiment is made up by a bottom portion 80 formed in a square shape and a wall portion 85 formed in a square frame along an outer edge (peripheral sides) of the bottom portion 80. Further, the liquid vessel 8 is opened on an opposite side of the bottom portion 80. The liquid vessel 8 is configured so as to hold a liquid L in an inner space I defined by the bottom portion 80 and the wall portion 85.

Specifically, the liquid vessel 8 is assembled from a plurality of first members 81, a second member 82 and a plurality of third members 83. The second member 82 is disposed in a central area of the bottom portion 80. The plurality of first members 81 are engaged with the second member 82. Each third member 83 is engaged with its adjacent first members 81 and the second member 82.

Figure 21:
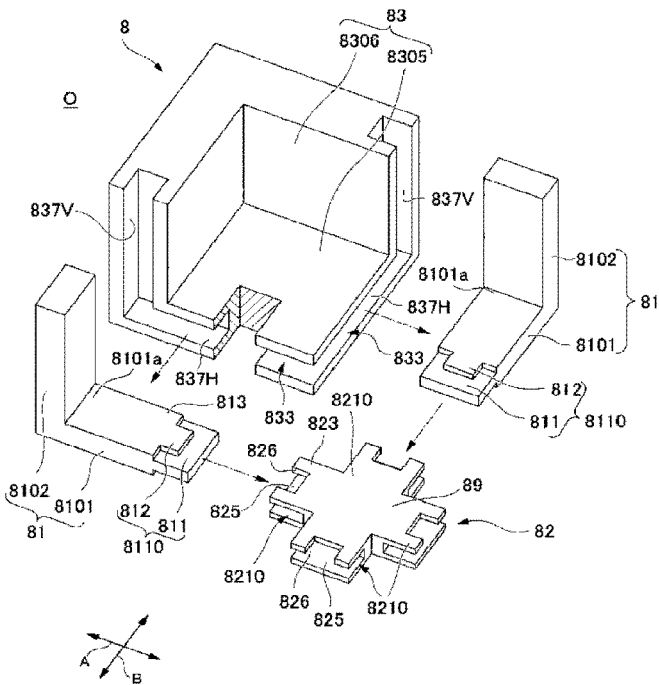
FIG. 21 is a disassembled perspective view illustrating a state wherein the liquid vessel illustrated in FIG. 20 has been disassembled.

As illustrated in FIG. 21, each first member 81 includes a first joint portion 8101 and a second joint portion 8102. The first joint portion 8101 forms a part of the bottom 80 of the liquid vessel 8 (see FIG. 19). The second joint portion 8102 extends from an outer end portion 8101a of the first joint portion 8101 to a depth direction of the liquid vessel 8. The second joint portion 8102 of each first member forms a part of the wall portion 85.

Figure 22:
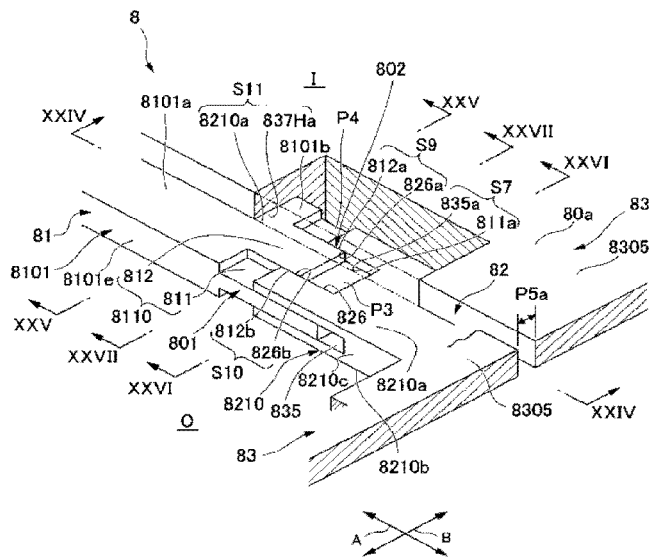
FIG. 22 is a perspective view illustrating how the liquid vessel illustrated in FIG. 21 is assembled by engagement.
Figure 23:
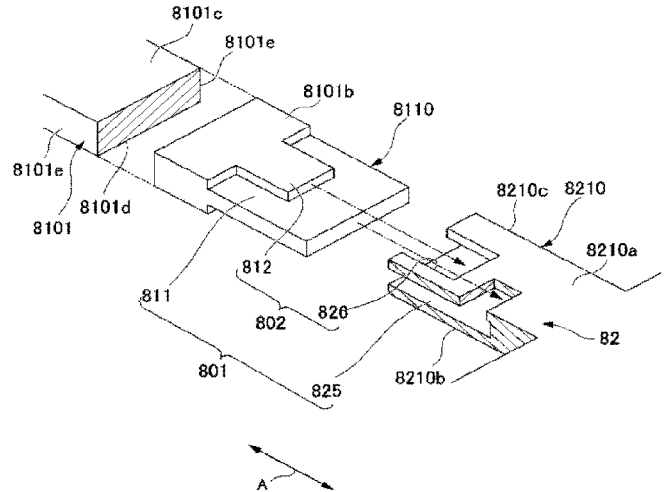
FIG. 23 is a disassembled perspective view illustrating a state wherein the first member and the second member illustrated in FIG. 22 has been disassembled.

As illustrated in FIGS. 22 and 23, each first joint portion 8101 includes a first inner joint surface 8101c, a first outer joint surface 8101d and a pair of first side joint surfaces 8101e. Each first inner joint surface 8101c is disposed on a side of the inner space I of the liquid vessel 8. Each first outer joint surface 8101d is disposed on a side of an external space O of the liquid vessel 8. One of paired first side joint surfaces 8101e is disposed to connect between one of both sides of the first inner joint surface 8101c and one of both sides of the first outer joint surface 8101d. The other one of the paired first side point surfaces 8101e is disposed to connect between the other side of the first inner joint surface 8101c and the other side of the first outer joint surface 8101d.

Each first joint portion 8101 is formed in a rectangular shape in section by its first inner joint surface 8101c, first outer joint surface 8101d and paired first side joint surfaces 8101e.

Each joint portion 8101 extends from the wall portion 85 of the liquid vessel 8 (see FIG. 19) to the second member 82. Each first joint portion 8101 includes a first engageable projecting portion 8110 formed on an end portion (hereinbelow, referred to as inner end portion) 8101b close to a central side of the liquid vessel 8. Each first engageable projecting portion 8110 is provided with a first projection 811 and a second projection 812.

Each first projection 811 is formed in a rectangular shape in section and projects toward a central area side of the liquid vessel 8 in a direction along a bottom surface (inner surface) 80a of the liquid vessel 8.

Each second projection 812 is formed on a side of a bottom surface 80a of the liquid vessel 8 with respect to its corresponding first projection 811. Each second projection 812 projects toward the central area side of the liquid vessel 8 in the direction along the bottom surface 80a of the liquid vessel 8.

Returning to FIG. 21, each first joint portion 8101 has a second joint portion 8102 formed on an outer end portion (opposite end portion) 8101a of its corresponding first engageable projecting portion 8110. Each second joint portion 8102 extends in a direction intersecting its corresponding first joint portion 8101 (in other words, a depth direction of the liquid vessel 8). The second joint portions 8102 are formed in a rectangular shape in section as in the first joint portions 8101.

The second member 82 is disposed at a central portion of the bottom portion 80 (see FIG. 19). The first engageable projecting portion 8110 of each first joint portion 8101 is engaged with the second member 82. The second member 82 includes a base 89 forming the central portion and a plurality of second engageable recessed portions 8210 formed the periphery of the base 89.

The second engageable recessed portions 8210 are disposed at four positions on the outer periphery of the base 89. In other words, the second engageable recessed portions 8210 are circumferentially disposed at equal intervals so as to radially project from the outer periphery of the base 89 toward an external space O of the liquid vessel 8. Each second engageable recessed portion 8210 includes a first recess 825 engageable with its corresponding first projection 811 and a second recess 826 formed at the first recess 825.

As illustrated in FIGS. 22 and 23, each second engageable portion 8210 includes a first inner engageable surface 80a a first outer engageable surface 8210b and a pair of first engageable side surfaces 8210c. Each first inner engageable surface 8210a is disposed on a side of the inner space I of the liquid vessel 8. Each first outer engageable surface 8210b is disposed on a side of the external space O of the liquid vessel 8. One of paired first engageable side surfaces 8210c is disposed to connect between one side of its corresponding first inner engageable surface 8210a and one side of its corresponding outer engageable surface 8210b. The other one of paired first engageable side surfaces 8210c is disposed to connect between the other side of its corresponding first inner engageable surface 8210a and the other side of its corresponding first outer engageable surface 8210b.

Each second engageable recessed portion 8210 has an outer shape formed in a rectangular shape in section by its corresponding first inner engageable surface 80a first outer engageable surface 8210b and paired first engageable side surfaces 8210c.

Each first recess 825 is open so as to be engageable with its corresponding first projection 811. Each second recess 826 is formed in a part of its corresponding second engageable recessed portion 8210 close to the bottom surface 80a of the liquid vessel 8 and is formed in a groove shape so as to be engageable with its corresponding second projection 812.

Each first projection 811 is engaged with its corresponding first recess 825 to form a first engageable portion 801. Each second projection 812 is engaged with its corresponding second recess 826 to form a second engageable portion 802.

The first projections 811 are engaged with the first recesses 825, and the second projections 812 are engaged with the second recesses 826, causing the first joint portions 8101 to radially extend from the second member 82.

Figure 24:
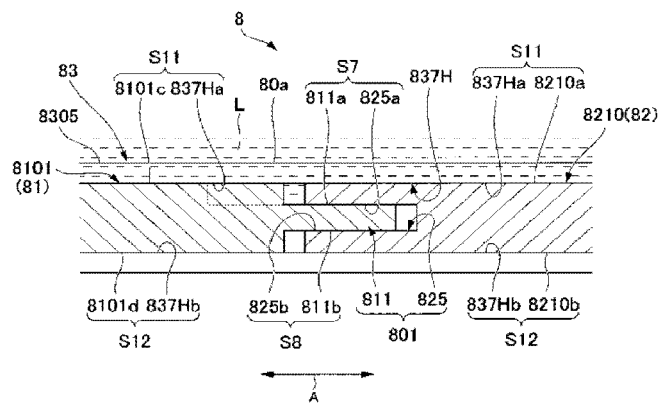
FIG. 24 is a cross-sectional view illustrating the liquid vessel taken along line XXIV-XXIV of FIG. 22.

As illustrated in FIG. 24, the first inner joint surface 8101c of each first joint portion 8101 and the first inner engageable surface 8210a of its corresponding second engageable recessed portion 8210 are disposed to be flush with each other. The first outer joint surface 8101d of each first joint portion 8101 and the first outer engageable surface 8210b of its corresponding second engageable recessed portion 8210 are disposed to be flush with each other.

Each first projecting portion 811 includes a pair of first projecting surfaces 811a and 811b. Each first recess 825 includes a pair of first recessed surfaces 825a and 825b. Each first projecting portion 811 is engaged with its corresponding first recess 825 to form a first narrow space S7 defined by one 811a of its paired first projecting surfaces 811a and 811b and one 825a of its corresponding paired first recessed surfaces 825a and 825b. The other one 811b of the paired first projecting surfaces 811a and 811b and its corresponding paired first recessed surfaces 825a and 825b form a first narrow space S8.

Thus, each first engageable portion 801 includes a pair of first narrow spaces S7 and S8. Each of paired first narrow spaces S7 and S8 has a gap formed as a space that prevents the liquid L in the liquid vessel 8 from flowing out. In other words, each of the first narrow spaces S7 and S8 is formed to have such a gap that the liquid L is prevented from entering each of the first narrow spaces S7 and S8 by surface tension.

In each of the paired first narrow spaces S7 and S8, the gap is formed so as to extend in an engagement direction of the first members 81 and the second member 82 (directions indicated by an arrow A) and in an intersecting direction as viewed from a direction along the bottom surface (inner surface) 80a of the liquid vessel 8 (i.e. the depth direction of the liquid vessel 8).

Returning to FIG. 22, each second projecting portion 812 has a pair of second projecting side surfaces 812a and 812b. Each second recess 826 includes a pair of second recessed side surfaces 826a and 826b. Each second projecting portion 812 is engaged with its corresponding second recess 826 to form a second narrow space S9 defined by one 812a of its paired second projecting side surfaces 812a and 812b and one 826a of its corresponding paired second recessed side surfaces 826a and 826b. The other one 812b of paired second projecting side surfaces 812a and 812b and the other one 826b of its corresponding paired second recessed side surfaces 826a and 826b form a second narrow space S10.

Thus, each second engageable portion 802 includes a pair of second narrow spaces S9 and S10. Each of the paired second narrow spaces S9 and S10 has a gap formed as a space that prevents the liquid L in the liquid vessel 8 from flowing out. In other words, each of the paired second narrow spaces S9 and S10 is formed so as to have a gap sized to prevent the liquid L from entering their corresponding first narrow spaces S7, S8 by surface tension. In each of the paired second narrow spaces S9 and S10, the gap is formed so as to extend in the engagement direction of the first members 81 and the second member 82 and in the direction along the bottom surface (inner surface) 80a of the liquid vessel 8.

As illustrated in FIG. 21, each third member 83 includes a first flat area 8305 and a second flat area 8306. Each first flat area 8305 is formed in a rectangular shape in a planar view and forms a part of the bottom portion 80 of the liquid vessel 8 (see FIG. 19). Each second flat area 8306 is bent in an L-character shape along an outer edge (peripheral side) of its corresponding first flat area 8305 in a planar view and forms a part of the wall portion 85 of the liquid vessel 8 (see FIG. 9).

Further, each third member 83 includes third recessed portions 833 engageable with its adjacent first members 81 and its adjacent second member 82. Each third recessed portion 833 has a third bottom recessed portion 837H formed at the first flat area 8305 and a third wall recessed portion 837V formed at the second flat area 8306.

Each third bottom recessed portion 837H is formed in a recessed shape in section so as to be engageable with the first joint portion 8101 of its adjacent first member 81 and the second member 82. Each third wall recessed portion 837V is formed in recessed shape in section so as to be engageable with the second joint portion 8102 of its adjacent first member 81.

Specifically, each third member 83 is engaged with third projecting portions 813 and 823 formed at lateral positions of its adjacent first members 81 and the second member 82, being brought into contact with these third projecting portions in a direction (directions indicated by an arrow B) intersecting the engagement direction of this adjacent first member 81 and the second member 82 (directions indicated by an arrow A).

Each third member 83 is engaged with its adjacent first member 81 in such a state that the plurality of first members 81 are engaged with the second member 82.

Figure 25:
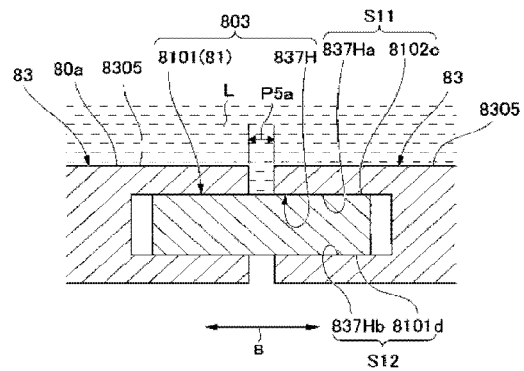
FIG. 25 is a cross-sectional view illustrating the liquid vessel taken along line XXV-XXV of FIG. 22.
Figure 26:
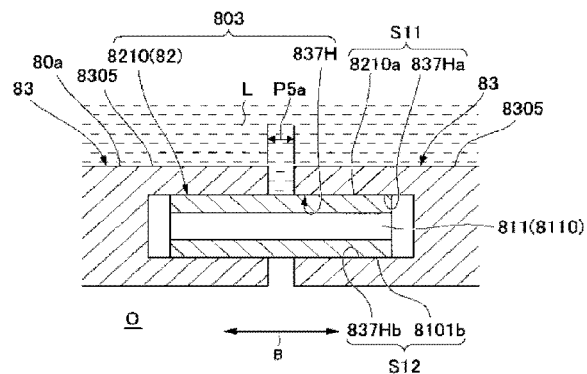
FIG. 26 is a cross-sectional view illustrating the liquid vessel taken along line XXVI-XXVI of FIG. 22.

As illustrated in FIGS. 24, 25 and 26, each third bottom recessed portion 837H is formed in a recessed shape in section and includes a third inner bottom recessed surface 837Ha and a third outer bottom recessed surface 837Hb. The third inner bottom recessed surfaces 837Ha and the third outer bottom recessed surfaces 837Hb are formed along the bottom surface 80a of the liquid vessel 8.

Each third bottom recessed portion H is engaged with the first joint portion 8101 of its adjacent first member 81 in a direction (directions indicated by an arrow B) intersecting an engagement direction of its adjacent first member 81 and the second member 82 (directions indicated by an arrow A). Each first joint portion 8101 and its corresponding third bottom recessed portion 837H form a third engageable portion 803. Further, each third bottom recessed portion 837H is engaged with the second member 82 in a direction (directions indicated by an arrow B) intersecting the engagement direction of its adjacent first member 81 and the second member 82 (directions indicated by the arrow A). The second member 82 and each third bottom recessed portion 837H form a third engageable portion 803.

Each third bottom recessed portion 837H is engaged with the first joint portion 8101 of its adjacent first member 81 to form a third narrow space S11 defined by its third inner bottom recessed surface 837Ha and the first inner joint surface 8101c of this first joint portion 8101. Each third outer bottom recessed surface 837Hb and the first outer joint surface 8101d of its corresponding first joint portion 8101 form a third narrow space S12.

Further, each third bottom recessed portion 837H is engaged with the second member 82 to form a third narrow space S11 defined by its third inner bottom recessed surface 837Ha and the first inner engageable surface 8210a of its corresponding first joint portion 8101. Each third outer bottom recessed surface 837Hb and the first outer engageable surface 8210b of its corresponding first joint portion 8101 form a third narrow space S12. In each of the third narrow spaces S11 and S12, the gap is formed as a space that prevents the liquid L in the liquid vessel 8 from flowing out. In each of the third narrow spaces S11 and S12, the gap is formed so as to extend in a direction intersecting the engagement direction of the first members 81 and the second member 82 and in an intersecting direction as viewed from the direction along the bottom surface 80a of the liquid vessel 8 (the depth direction of the liquid vessel 8).

As illustrated in FIGS. 20 and 21, the third recessed all portion 837V of each second flat area 8306 is engaged with the second joint portion 3102 of its adjacent first member 81 to form a third narrow space S13 and a third narrow space S14. Each third narrow space S13 is continuous to its corresponding third narrow space S11 (see FIG. 24). Each third narrow space S14 is continuous to its corresponding third narrow space S12 (see FIG. 24).

Each of the third narrow spaces S13 and S14 has a gap formed as a space that prevents the liquid L in the liquid vessel 8 from flowing out. In other words, each of the third narrow spaces S13 and S14 has a gap to prevent the liquid L from entering its corresponding narrow spaces S7 and S8 based on the relationship between the surface tension and the contact angle of the liquid.

Figure 27:
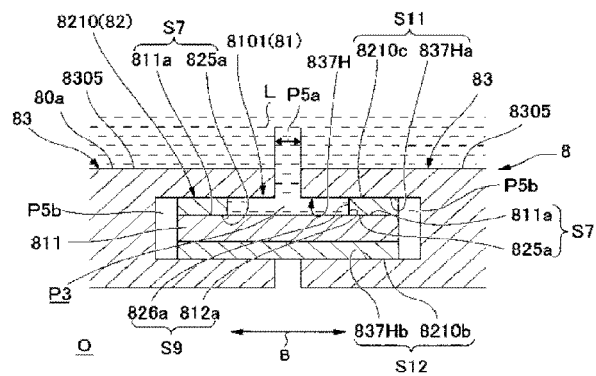
FIG. 27 is a cross-sectional view illustrating the liquid vessel taken along line XXVII-XXVII of FIG. 22.

As illustrated in FIGS. 22 and 27, the first projecting surface 811a of each first projecting portion 811 and the first recessed surface 825a of its corresponding first recess 825 form a first narrow space S7 on a side of the bottom surface 80a of the liquid vessel 8. The second projecting side surface 812a of each second projecting portion 812 and the second recessed side surface 826a of its corresponding second recess 826 form a second narrow space S9 on the side of the bottom surface 80a of the liquid vessel 8. The first engageable inner surface 8210a of each second engageable recessed portion 8210 and the third inner bottom recessed surface 837Ha of its corresponding third bottom recessed portion 837H form a third narrow space S11 on the side of the bottom surface 80a of the liquid vessel 8.

Each second narrow space S9 is interposed between its adjacent first narrow space S7 on the side of the bottom surface 80a and its adjacent third narrow space S11 on the side of the bottom surface 80a, and each first narrow space S7 on the side of the bottom surface 80a is continuous to its adjacent third narrow space S11 on the side of the bottom surface 80a through their adjacent second narrow space S9.

Each first member 81 and the second member 82 are brought into contact with each other so as to form a space P3 and a space P4 at their first engageable portion 801 and their second engageable portion 802 when the liquid vessel is subjected, for example, to deformation caused by an earthquake or to an installation error. The first flat area 8305 of one of adjacent third members 83 and the first flat area 8305 of the other one of these adjacent third members 83 are brought into contact with each other so as to form a space P5a between these adjacent third members 83 brought into contact with each other, when the liquid vessel is subjected, for example, to deformation caused by an earthquake or to an installation error.

Further, each first member 81 and its adjacent third member 83 are brought into contact with each other so as to form a space P5b when the liquid vessel is subjected, for example, to deformation caused by an earthquake or to an installation error.

In the second embodiment, each space P4 never communicates with the external space O of the liquid vessel 8. In the second embodiment, the space P3 between each second projecting portion 812 and its corresponding second recess 826 never communicates with the space P5a between the first flat areas 8305 and 8305 on both sides of its corresponding first joint portion 8101. This is because measures are taken such that the liquid L that has entered in each space P3 is prevented from flowing into its corresponding space P4.

In other words, in the second embodiment, sets of a first narrow space S7, a second space S9 and a third space S11 are provided. Thus, such sets of a first narrow space S7, a second space S9 and a third space S11 avoid that the liquid L that flows into the spaces P3 from their corresponding spaces P5a flows into the spaces P4.

The plurality of first members 81, the second member 82 and the plurality of third members 83 can be all engaged as illustrated in FIGS. 20 and 21 to easily make up the liquid vessel 8 in a large size of prefabricated form.

Specifically, the liquid vessel 8 can be assembled in a large size so as to have the bottom portion 80 formed in a square shape in a planar view and the wall portion 85 formed in a square frame along the bottom portion 80.

The liquid vessel 8 can be made up in a large size of prefabricated form by a simple structure that each first member 81 is merely provided with a first projecting portion 811 and a second projecting portion 812, the second member 82 is merely provided with the first recesses 825 and the second recesses 826, and each third member 13 is merely provided with a third recessed portion 833.

Further, the second member 82 is provided with a plurality of second engageable recessed portions 8210, and the first members 11 are engaged with the second engageable recessed portions 8210. Thus, the plurality of first members 81 are engaged with the single second member 82. The number of the parts required for assembling the liquid vessel 8 can be minimized to simplify the structure.

The third members 83 are engaged with the first members 81 and the second member 82 to form the bottom portion 80 and the wall portion 85 of the liquid vessel 8 for example. Thus, the number of the parts required for assembling the liquid vessel 8 can be further minimized to simplify the structure.

Although explanation of the liquid vessel 8 according to the second embodiment has been made about a case where the first joint portion 8101 of each first member 81 is provided with a first engageable projecting portion 8110, and the second member 82 is provided with the second engageable recessed portions 8210, the present invention is not limited to such a case. As another case, each first joint portion 8101 may be provided with a second engageable recessed portion 8210, and the second member 82 may be provided with first engageable projecting portions 8110.

Third Embodiment

Figure 28:
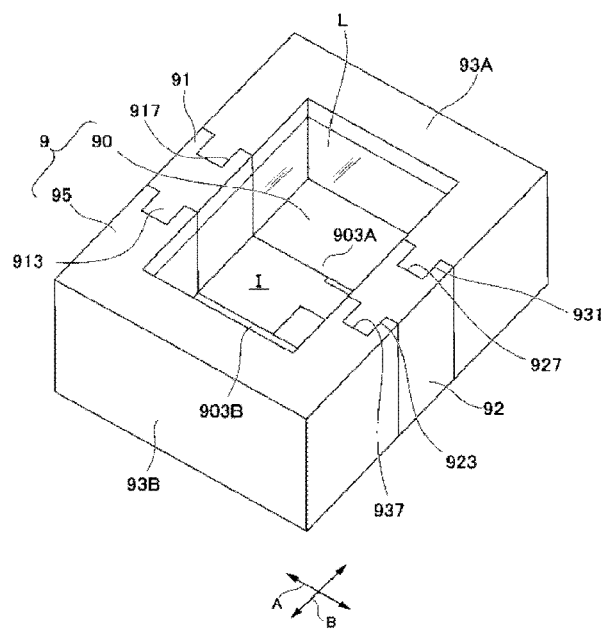
FIG. 28 is a perspective view illustrating a third embodiment of the liquid vessel according to the present invention.
Figure 29:
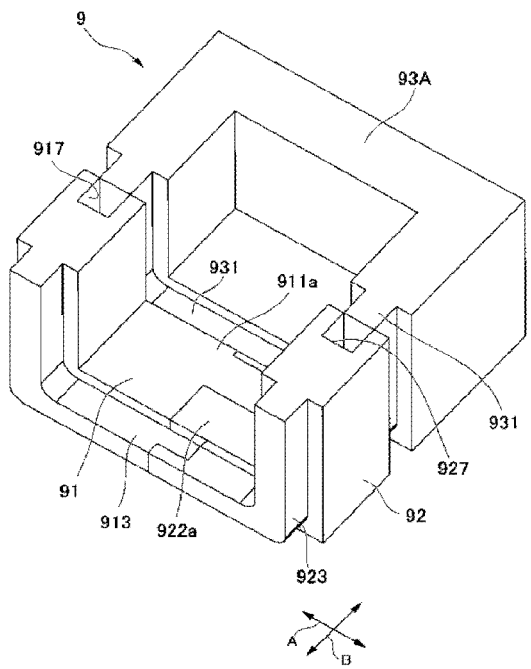
FIG. 29 is a perspective view illustrating a state wherein a third member is removed from the liquid vessel illustrated in FIG. 28.

As illustrated in FIGS. 28 and 29, the liquid vessel 9 according to this embodiment of the present invention includes a bottom portion 90 formed in a square shape, and a wall portion 95 formed in a square frame along an outer edge (peripheral sides) of the bottom portion 90. The liquid vessel 9 is open on an opposite side of the bottom portion 90. The liquid vessel 9 is configured to hold a liquid L in an inner space I defined by the bottom portion 90 and the wall portion 95.

Specifically, the liquid vessel 9 is assembled from a first member 91, a second member 92 and a pair of third members 93A and 93B.

Explanation will be made, the engagement direction of the first member 91 and the second member 92 being called directions indicated by an arrow A, and directions orthogonal to the directions indicated by the arrow A being called directions indicated by an arrow B.

The first member 91 is disposed at a central position of the liquid vessel 9 in the directions indicated by the arrow B and on one side in the directions indicated by the arrow A. The second member 92 is disposed at a central position of the liquid vessel 9 in the directions indicated by the arrow B and on the other side in the directions indicated by the arrow A. Each of the first member 91 and the second member 92 is formed in an L-character shape in a side view. The first member 91 has a leading edge portion 911a engaged with a leading edge portion 922a of the second member 92. The first member 91 has a third recessed portion 917 formed at one of lateral sides while the second member 92 has a third recessed portion 927 formed at one of lateral sides. The first member 91 has a third projecting portion 913 formed on the other lateral side while the second member 92 has a third projecting portion 923 formed at the other lateral side.

The third member 93A has third projecting portions 931 engaged with the third recessed portions 917 and 927 to form one 903A of third engageable portions. The third member 93B has a third recessed portion 937 engaged with the third projecting portions 913 and 923 to form the other 903B of the third engageable portions.

Figure 30:
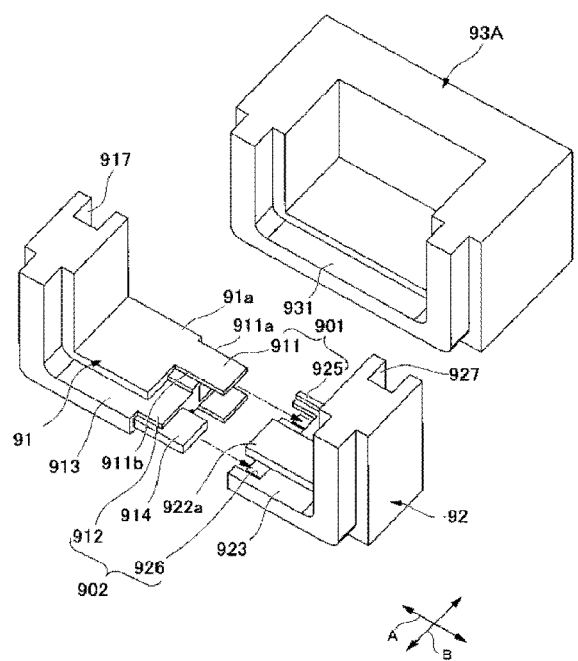
FIG. 30 is a disassembled perspective view illustrating a state wherein the liquid vessel illustrated in FIG. 29 has been disassembled.
Figure 31:
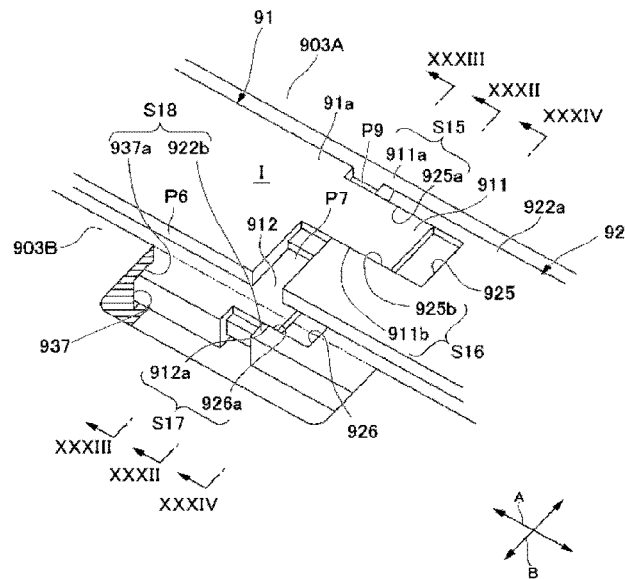
FIG. 31 is a perspective view illustrating how the liquid vessel illustrated in FIG. 30 is assembled by engagement.
Figure 32:
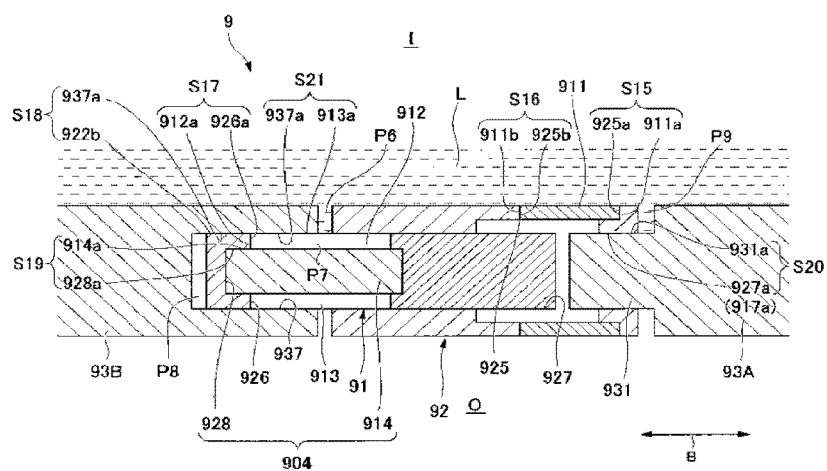
FIG. 32 is a cross-sectional view illustrating the liquid vessel taken along line XXXII-XXXII of FIG. 31.

As illustrated in FIGS. 30, 31 and 32, the first member 91 has a first projecting portion 911 engaged with a first recessed portion 925 of the second member 92 to form a first engageable portion 901. The first projecting portion 911 has projecting side surfaces, one 911a of which forms a fourth narrow space S15 along with its corresponding one 925a of recessed side surfaces of the first recessed portion 925. The other projecting side surface 911b of the first projecting portion 911 forms a fourth narrow space S16 along with the other recessed side surface 925b of the first recessed portion 925.

Each of the fourth narrow spaces S15 and S16 has a gap formed as a space that prevents the liquid L in the liquid vessel 9 from flowing out.

The first member 91 has a second projecting portion 912 engaged with a second recess 926 of the second member 92 to form a second engageable portion 902. The second projecting portion 912 has a projecting side surface 912a, which forms a second narrow space S17 along with a recessed side surface 926a of the second recess 926. The second narrow space S17 has a gap formed as a space that prevents the liquid L in the liquid vessel 9 from flowing out.

The third member 93B has a third recessed portion 937, which has a recessed surface 937a to form a third narrow space S18 along with a projecting surface 922 on the other side of the second member 92. The third narrow space S18 has a gap formed as a space that prevents the liquid L in the liquid vessel 9 from flowing out.

Further, the first member 91 has a fourth projecting portion 914 engaged with a fourth recessed portion 928 of the second member 92 to form a fourth engageable portion 904. The fourth projecting portion 928 has a recessed surface 928a, which forms a first narrow space S19 along with a projecting surface 914a of the fourth projecting portion 914. The first narrow space S19 has a gap formed as a space that prevents the liquid L in the liquid vessel 9 from flowing out.

The second narrow space S17 is interposed between the first narrow space S19 and the third narrow space S18, and the first narrow space S19 is continuous to the third narrow space S18 through the second narrow space S17.

Thus, the liquid L that flows into a space P6 is prevented from flowing into a space P8 through a space P8 by the first narrow space S19, the second narrow space S17 and the third narrow space S18.

Figure 33:
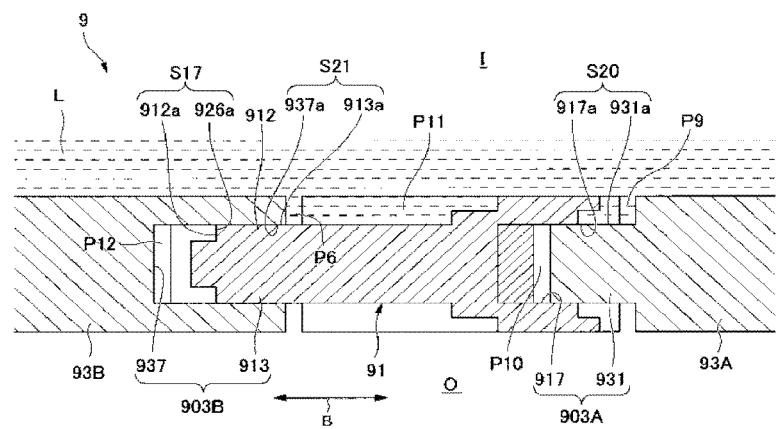
FIG. 33 is a cross-sectional view illustrating the liquid vessel taken along line XXXIII-XXXIII of FIG. 31.
Figure 34:
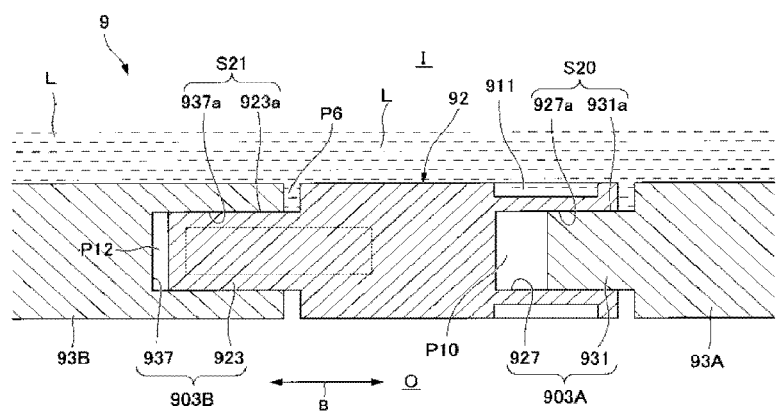
FIG. 34 is a cross-sectional view illustrating the liquid vessel taken along line XXXIV-XXXIV of FIG. 31.

As illustrated in FIGS. 32 to 34, in the one 903A of the third engageable portions, the third projecting portion 931 is engaged with the third recessed portions 917 and 927. A recessed surface 917a of the third recessed portion 917 and a recessed surface 927a of the third recessed portion 927 form one of third narrow spaces S20.

The one of the third narrow spaces S20 has a gap formed as a space that prevents the liquid L in the liquid vessel 9 from flowing out. Thus, the liquid L that flows into a space P9 is prevented from flowing into a space P10 by the third narrow portion S20.

In the other third engageable portion 903B, the third recessed portion 937 is engaged with the third projecting portion 913 of the first member 91 and the third projecting portion 923 of the second member 92. A recessed surface 937a of the third recessed portion 937, a projecting surface 913a of the third projecting portion 913 and a projecting surface 923a of the third projecting portion 923 form other third narrow space S21.

The other third narrow space S21 has a gap formed as a space that prevents the liquid L in the liquid vessel 9 from flowing out. The liquid vessel 9 has an inner side defined by the first member 91, the second member 92 and the paired third members 93A and 93B. Thus, the liquid L that flows into a space P11 is prevented from flowing into a space P12 by the other third narrow portion S21.

Thus, the first member 91, the second member 92 and the paired third members 93A and 93B can be all engaged as illustrated in FIGS. 28 to 34 to easily make up the liquid vessel 9 in a large size of prefabricated form.

Specifically, the liquid vessel 9 can be assembled in a large size so as to have the bottom portion 90 formed in a square shape in a planar view and the wall portion 95 formed in a square frame along the bottom portion 90.

The liquid vessel according to the present invention is applicable to a vessel for holding various kinds of liquids in a wide range of fields. As a preferred example, the liquid vessel is usable as a molten metal bath for glass product production, which holds a liquid, such as molten metal for producing glass products, such as glass plates, by a float process, for example, disclosed in WO2012/060197A. In the molten metal bath used in a float process, for example, molten metal, specifically molten tin, is held as the liquid L.

As another example, the liquid vessel is applicable to a bath for holding molten glass for producing glass products. As the bath for holding molten glass, the liquid vessel is applicable to a refiner for removing bubbles in molten glass after melding glass materials, a canal for forming molten glass by a down-draw process, or a forming apparatus called sword. Further, the liquid vessel according to the present invention may be used in the method for producing glass products such that a molten metal bath, a canal, a sword or the like that has been used in conventional glass production equipment is replaced by the vessel structure according to the present invention.

The materials for forming the liquid vessel according to the present invention may be different, depending on the kinds of held liquids, and materials which are not eroded by a held liquid is normally used. For example, stainless steel is used. For example, as the materials required to be refractory, carbon, a boron nitride or the like may be used.

This application is a continuation of PCT Application No. PCT/JP2018/028485, filed on Jul. 30, 2018, which is based upon and claims the benefit of priority from Japanese Patent Application No. 2017-150857 filed on Aug. 3, 2017. The contents of those applications are incorporated herein by reference in their entireties.

REFERENCE SYMBOLS

L: Liquid, 1, 2, 3, 4, 5, 6, 7, 8 and 9: liquid vessel 10, 50, 6, 70, 80 and 90: bottom portion 10a and 80a: bottom surface (inner surface) 15, 55, 65, 75, 85 and 95: wall portion 11, 21, 31, 41, 51, 61, 71, 81 and 91: first member 12, 22, 32, 42, 52, 62, 72, 82 and 92: second member 13, 23, 33, 43, 53, 63, 73, 83, 93A and 93B: third member 34, 64: fourth member, 35: fifth member, 36: sixth member 101, 801 and 901: first engageable portion 102, 802 and 902: second engageable portion 103, 803, 903A and 903B: third engageable portion S1, S2, S7, S8 and S19: first narrow space S3, S4, S9, S10 and S17: second narrow space S5, S6, S11, S12, S13, S14, S18, S20 and S21: third narrow space S15 and S16: fourth narrow space 111, 811 and 911: first projecting portion 122, 812 and 912: second projecting portion 133, 233, 813, 823, 913, 923 and 931: third projecting portion 914: fourth projecting portion, 125, 825 and 925: first recess 116, 826 and 926: second recess 117, 127, 217, 833, 917, 927 and 937: third recessed portion 928: fourth recessed portion, 1101, 5101 and 8101: first joint portion 1102 and 8102: second joint portion, 1305 and 8305: first flat area 1306 and 8306: second flat area

What is claimed is:

1. A liquid vessel for holding a liquid, comprising:
a plurality of members comprising a first member, a second member and a third member; and
a plurality of engageable portions comprising a first engageable portion, a second engageable portion and a third engageable portion,
wherein the first engageable portion and second engageable portion are configured to bring the first member and the second member into contact and engage with each other such that the first member and the second member have a degree of freedom in an engagement direction of the first member and the second member, and the third engageable portion is configured to bring the third member into contact with the first member and the second member in an engagement direction intersecting the engagement direction of the first member and the second member and engage with the first member and the second member such that the third member has a degree of freedom in the engagement direction intersecting the engagement direction of the first member and the second member.

2. The liquid vessel according to claim 1, wherein:
the first engageable portion includes a first narrow space, which has a gap formed in the engagement direction of the first member and the second member and in an intersecting direction as viewed from a direction along an inner surface of the liquid vessel;
the second engageable portion includes a second narrow space, which has a gap formed in the engagement direction of the first member and the second member and in the direction along the inner surface of the liquid vessel;
the third engageable portion includes a third narrow space, which has a gap formed in a direction intersecting the engagement direction of the first member and the second member and in an intersecting direction as viewed from the direction along the inner surface of the liquid vessel;
the second narrow space is interposed between the first narrow space and the third narrow space, and the first narrow space and the third narrow space is continuous to each other through the second narrow space; and
the liquid vessel includes a wall portion, the wall portion having an inner side defined by at least the third member, the wall portion extending in a depth direction of the liquid vessel from a bottom portion of the liquid vessel and a periphery of the bottom portion.

3. The liquid vessel according to claim 1, wherein:
one member of the first member and the second member has a first projecting portion projecting in a direction along an inner surface of the liquid vessel and a first recessed portion formed in the first projecting portion;
the other member of the first member and the second member has a second recessed portion engageable with the first projecting portion and a second projecting portion formed in the second recessed portion so as to be engageable with the first recessed portion;
the third member has a third projecting portion engageable with the first member and the second member;
the first projecting portion and the first recessed portion are engaged with each other to form a first narrow space;
the second projecting portion and the second recessed portion are engaged with each other to form a second narrow space; and
the first member and the second member are engaged with the third projection to form a third narrow space.

4. The liquid vessel according to claim 1, wherein:
one member of the first member and the second member has a first projecting portion projecting in a direction along an inner surface of the liquid vessel and a second projecting portion formed on the first projecting portion along the inner surface of the liquid vessel;
the other member of the first member and the second member has a first recessed portion engageable with the first projecting portion and a second recessed portion formed in the first recessed portion so as to be engageable with the second projecting portion;
the third member has a third recessed portion engageable with the first member and the second member;
the first projecting portion and the first recessed portion are engaged with each other to form a first narrow space;
the second projecting portion and the second recessed portion are engaged with each other to form a second narrow space; and
the first member and the second member are engaged with the third recessed portion to form a third narrow space.

5. The liquid vessel according to claim 3, wherein:
the other member of the first member and the second member is formed in a radial shape;
the one member of the first member and the second member is engaged with the other member formed in a radial shape such that the one member is extended so as to have radial extensions; and
the third member is engaged between adjacent radial extensions of the one member.

6. The liquid vessel according to claim 5, wherein:
the one member is engaged with the other member to have a first joint portion radially extending and a second joint portion extending in a direction intersecting the first joint portion from an opposite side of a side where both members re engaged; and
the third member has a first flat area engageable with the first joint portion and the second flat area engageable with the second joint portion.

7. The liquid vessel according to claim 1, wherein:
the liquid vessel has a bottom portion formed in a polygonal shape and a wall portion formed along the bottom portion; and
the liquid vessel is open on an opposite side of the bottom portion.

8. The liquid vessel according to claim 7, wherein the liquid vessel has the bottom portion formed in a square shape and the wall portion formed in a square frame along the bottom portion.

9. The liquid vessel according to claim 7, wherein the liquid vessel is closed on the opposite side of the bottom portion.

10. The liquid vessel according to claim 2, wherein when the first narrow space, the second narrow space and the third narrow space have a gap of GAP, and the GAP satisfies formula, $GAP \leq 2\sigma \cdot \cos\theta/(\rho \cdot g \cdot d)$ where $\sigma$ is a surface tension of a held liquid, $\theta$ is a contact angle of the held liquid, $\rho$ is a density of the held liquid, g is a gravity acceleration and d is a height of a liquid surface of the held liquid in the liquid vessel.

11. The liquid vessel according to claim 1, wherein the liquid vessel is configured to hold molten glass.

12. The liquid vessel according to claim 1, wherein the liquid vessel is configured to hold molten metal.

13. The liquid vessel according to claim 1, wherein the first engageable portion and second engageable portion are configured to shift the first member and the second member engaged with each other in the engagement direction of the first member and the second member when at least one of the first, second and third members undergoes deformation, and the third engageable portion is configured to shift the third member engaged with the first member and the second member in the engagement direction intersecting the engagement direction of the first member and the second member when at least one of the first, second and third members undergoes deformation.

14. The liquid vessel according to claim 1, wherein the first engageable portion and second engageable portion are configured to form a space between the first member and the second member engaged with each other in the engagement direction of the first member and the second member, and the third engageable portion is configured to form a space between the third member engaged with the first member and the first member and a space between the third member engaged with the second member and the second member in the engagement direction intersecting the engagement direction of the first member and the second member.

15. The liquid vessel according to claim 13, wherein the liquid vessel is configured to hold molten glass and/or molten metal.

16. The liquid vessel according to claim 14, wherein the liquid vessel is configured to hold molten glass and/or molten metal.

17. The liquid vessel according to claim 13, wherein:
one member of the first member and the second member has a first projecting portion projecting in a direction along an inner surface of the liquid vessel and a first recessed portion formed in the first projecting portion;
the other member of the first member and the second member has a second recessed portion engageable with the first projecting portion and a second projecting portion formed in the second recessed portion so as to be engageable with the first recessed portion;
the third member has a third projecting portion engageable with the first member and the second member;
the first projecting portion and the first recessed portion are engaged with each other to form a first narrow space;
the second projecting portion and the second recessed portion are engaged with each other to form a second narrow space; and
the first member and the second member are engaged with the third projection to form a third narrow space.

18. The liquid vessel according to claim 3, wherein:
one member of the first member and the second member has a first projecting portion projecting in a direction along an inner surface of the liquid vessel and a first recessed portion formed in the first projecting portion;
the other member of the first member and the second member has a second recessed portion engageable with the first projecting portion and a second projecting portion formed in the second recessed portion so as to be engageable with the first recessed portion;
the third member has a third projecting portion engageable with the first member and the second member;
the first projecting portion and the first recessed portion are engaged with each other to form a first narrow space;
the second projecting portion and the second recessed portion are engaged with each other to form a second narrow space; and
the first member and the second member are engaged with the third projection to form a third narrow space.

* * * * *